(12) United States Patent
Zhang et al.

(10) Patent No.: US 12,519,877 B2
(45) Date of Patent: Jan. 6, 2026

(54) HOOK MECHANISM, SUPPORT APPARATUS, AND ELECTRONIC DEVICE

(71) Applicant: Honor Device Co., Ltd., Shenzhen (CN)

(72) Inventors: Yaolei Zhang, Shenzhen (CN); Guotong Zhou, Shenzhen (CN); Bin Yan, Shenzhen (CN); Yihe Zhang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 282 days.

(21) Appl. No.: 18/550,363

(22) PCT Filed: Dec. 29, 2022

(86) PCT No.: PCT/CN2022/143592
§ 371 (c)(1),
(2) Date: Sep. 13, 2023

(87) PCT Pub. No.: WO2023/138340
PCT Pub. Date: Jul. 27, 2023

(65) Prior Publication Data
US 2024/0171665 A1    May 23, 2024

(30) Foreign Application Priority Data
Jan. 18, 2022 (CN) .......................... 202210056058.2
Apr. 8, 2022 (CN) .......................... 202210366995.8

(51) Int. Cl.
*H04M 1/02* (2006.01)
*F16C 11/04* (2006.01)
*G06F 1/16* (2006.01)

(52) U.S. Cl.
CPC ............ *H04M 1/0268* (2013.01); *F16C 11/04* (2013.01); *G06F 1/1681* (2013.01); *H04M 1/0216* (2013.01)

(58) Field of Classification Search
CPC .. H04M 1/0268; H04M 1/0216; H04M 1/022; F16C 11/04; F16C 2370/00;
(Continued)

(56) References Cited

U.S. PATENT DOCUMENTS 11,231,754 B2    1/2022   Kang et al.
11,467,633 B2 *  10/2022  Liao ...................... G06F 1/1641
(Continued)

FOREIGN PATENT DOCUMENTS

CN         205620858 U      10/2016
CN         108953364 A      12/2018
(Continued)

*Primary Examiner* — Ankur Jain
(74) *Attorney, Agent, or Firm* — Slater Matsil, LLP

(57) ABSTRACT

This application relates to a hook mechanism, a support apparatus, and an electronic device. The hook mechanism includes a shaft cover, a base, and swing arms, and a plurality of first mounting parts are disposed in the shaft cover. The base is fixedly disposed in the shaft cover. The swing arms are disposed at two ends of the shaft cover along a first direction, and a second mounting part is disposed on the swing arm. The swing arm is rotatably connected to the base, so that the swing arm can rotate between an unfolded location and a folded location; and when the swing arms are in the unfolded location, the first mounting part is separated from a corresponding second mounting part; or when the swing arms are in the folded location, the first mounting part is mounted to the corresponding second mounting part.

20 Claims, 26 Drawing Sheets

(58) Field of Classification Search
CPC .. F16C 2380/00; G06F 1/1681; G06F 1/1652; H05K 5/0226
See application file for complete search history.

(56) References Cited

U.S. PATENT DOCUMENTS

| | | | |
|---|---|---|---|
| 2020/0042039 A1 | 2/2020 | Casey | |
| 2020/0387193 A1 | 12/2020 | Casey | |
| 2022/0321683 A1* | 10/2022 | Luo | H04M 1/0268 |
| 2024/0004430 A1* | 1/2024 | Zhao | F16C 11/04 |
| 2024/0094785 A1* | 3/2024 | Cheng | H04M 1/022 |
| 2024/0111340 A1* | 4/2024 | Niu | G09F 9/301 |

FOREIGN PATENT DOCUMENTS

| | | |
|---|---|---|
| CN | 111147630 B | 4/2021 |
| CN | 112995368 A | 6/2021 |
| CN | 113067923 A | 7/2021 |
| CN | 113194183 A | 7/2021 |
| CN | 113315860 A | 8/2021 |
| CN | 113719525 A | 11/2021 |
| CN | 114076144 A | 2/2022 |
| EP | 3734946 A1 | 11/2020 |

\* cited by examiner

HOOK MECHANISM, SUPPORT APPARATUS, AND ELECTRONIC DEVICE

CROSS-REFERENCE TO RELATED APPLICATIONS

This application is a national stage of International Application No. PCT/CN2022/143592, filed on Dec. 29, 2022, which claims priority to Chinese Patent Application No. 202210056058.2, filed on Jan. 18, 2022, and Chinese Patent Application No. 202210366995.8, filed on Apr. 8, 2022. The disclosures of each of the aforementioned applications are hereby incorporated by reference in their entireties.

TECHNICAL FIELD

This application relates to the field of electronic device technologies, and in particular, to a hook mechanism, a support apparatus, and an electronic device.

BACKGROUND

With the advancement in science and technology, an era of a large-screen intelligent terminal is approaching. To resolve a problem that a conventional tablet computer is large in volume and inconvenient to carry, and a problem that a screen of a bar-type mobile phone is small, a foldable screen terminal emerges.

The foldable screen terminal may be divided into a first middle frame part, a second middle frame part, and a rotating shaft mechanism part. Two sides of the rotating shaft mechanism are fixedly connected to the first middle frame part and the second middle frame part respectively. A flexible foldable screen is attached to a plane formed by the first middle frame part, the second middle frame part, and the rotating shaft structure part. The first middle frame and the second middle frame rotate around the rotating shaft mechanism, so that the foldable screen terminal rotates between a folded state and an unfolded state.

The rotating shaft mechanism includes a base and a shaft cover, and the base and the shaft cover are fixedly connected by using a screw, glue dispensing, or the like. When the terminal is in the folded state, the shaft cover is exposed. However, due to reasons such as space and layout, fixed points between the shaft cover and the base are reduced, or a distance between two adjacent fixed points is excessively large, which causes a problem that fixing between the shaft cover and the base is not firm. When the terminal is in the folded state and the shaft cover is exposed, if the shaft cover is not firmly fixed to the base, the shaft cover may be subject to warpage and deformation, which affects overall aesthetic appearance, and even causes serious problems such as falling off of the shaft cover.

SUMMARY

In view of this, this application provides a hook mechanism, a support apparatus, and an electronic device, to resolve a problem that fixing between a shaft cover and a base that are of a foldable screen terminal is not firm.

According to a first aspect, this application provides a hook mechanism, including a shaft cover, a base, and swing arms, and a plurality of first mounting parts are disposed in the shaft cover. The base is fixedly disposed in the shaft cover. The swing arms are disposed at two ends of the shaft cover along a first direction, and a second mounting part is disposed on the swing arm. The swing arm is rotatably connected to the base, so that the swing arm can rotate between an unfolded location and a folded location; and when the swing arms are in the unfolded location, the swing arms are located on two sides of the shaft cover along the first direction, and the first mounting part is separated from a corresponding second mounting part; or when the swing arms are in the folded location, the swing arms located on the two sides of the shaft cover along the first direction rotate to one side of the base away from the shaft cover, the swing arms located on the two sides of the shaft cover along the first direction are disposed opposite to each other, and the first mounting part is mounted to the corresponding second mounting part.

According to the hook mechanism provided in the first aspect of this application, when the swing arm is in the folded location, because the first mounting part and the second mounting part can be mounted to each other, the swing arm can apply tensile force to the shaft cover towards the base, and even if the shaft cover is exposed to the outside, it can be ensured that the shaft cover cannot be subject to warpage and deformation in a direction away from the base. In addition, the swing arms are disposed at the two ends of the shaft cover along the first direction and on the two sides of the shaft cover along the first direction. On the one hand, this helps balance force on the shaft cover. On the other hand, strength of the two ends of the shaft cover along the first direction is enhanced. Therefore, overall connection strength of the shaft cover can be improved, thereby preventing end parts of the shaft cover from being subject to warpage and deformation in the direction away from the base under an action of external force. In comparison with the conventional technology, according to the hook mechanism provided in this embodiment of this application, on a basis that the shaft cover is fixedly connected to the base by using a screw or glue dispensing, the mounting structure including the first mounting part and the second mounting part is added. When the swing arm is in the folded location, connection strength of the shaft cover is further improved, to prevent the shaft cover from being subject to warpage and deformation, which is beneficial to overall aesthetic appearance, and improves user experience.

In some embodiments of this application, the first mounting part has a first fitting part, and the second mounting part has a second fitting part; and when the swing arm is in the folded location, the first fitting part cooperates with and abuts against the second fitting part. The first fitting part and the second fitting part cooperate with and abut against each other, so that the first mounting part and the second mounting part are mounted to each other, thereby helping improve connection strength of the shaft cover.

In some embodiments of this application, the first fitting part is a first surface, the first surface faces away from the base, the second fitting part is a second surface, and when the swing arm is in the folded location, the second surface faces towards the base, and the first surface abuts against the second surface. In this way, the first mounting part and the second mounting part can be enabled to apply tensile force to each other, so that the swing arm and the shaft cover cannot move in a direction away from each other. That is, the second mounting part applies, by using the first mounting part, tensile force to the shaft cover in a direction facing towards the base, to prevent the shaft cover from being subject to warpage and deformation in the direction away from the base, and help improve fixing strength of the shaft cover.

In some embodiments of this application, the first mounting part includes a first mounting protrusion, the first mounting protrusion has the first surface, and a groove is formed between the first surface and a bottom wall of the shaft cover; the second mounting part includes a second mounting protrusion, and the second mounting protrusion has the second surface; and when the swing arm is in the folded location, the second mounting protrusion is inserted into the groove, and the second surface abuts against the first surface. The first mounting protrusion and the second mounting protrusion abut against each other to implement mutual location limiting, so as to prevent the first mounting protrusion and the second mounting protrusion from moving away from each other in a direction perpendicular to the bottom wall of the shaft cover, in other words, the shaft cover and the swing arm cannot move away from each other, so that the shaft cover cannot be subject to warpage and deformation in the direction away from the swing arm or the base.

In some embodiments of this application, the second mounting protrusion is disposed on a side of the corresponding swing arm close to an end part of the shaft cover. The second mounting protrusion is disposed on a side close to the end part of the shaft cover, that is, located in two swing arms at the two ends of the shaft cover in a length direction, and is located between two second mounting protrusions. In this way, the second mounting protrusion can be relatively close to the end part of the shaft cover, which helps improve fixing strength of the end part of the shaft cover.

In some embodiments of this application, the swing arm includes a swing arm body, a connecting arm, and a slider. A first end of the connecting arm is fixedly connected to the swing arm body, and a second end of the connecting arm is fixedly connected to the slider. The slider is rotatably connected to the base, and the second mounting part is disposed on the slider. The slider is rotatably connected to the base, and the slider is fixedly connected to the swing arm body by using the connecting arm, so that the swing arm body can rotate relative to the base along with the slider. The swing arm body is configured to be fixedly connected to a middle frame of an electronic device, so that the middle frame can drive a foldable screen to rotate between the folded location and the unfolded location.

In some embodiments of this application, a sliding groove is provided on the base, a groove wall of the sliding groove is an arc-shaped surface structure, an axis of the arc-shaped surface structure is parallel to a rotation axis of the swing arm, and the slider is disposed in the sliding groove. In this way, the sliding groove slides along a track of an arc-shaped surface structure, so that the slider can rotate around an axis of the arc-shaped surface structure, the swing arm body and the middle frame can be driven to rotate, and the middle frame drives the foldable screen to rotate between the folded location and the unfolded location.

In some embodiments of this application, an avoidance part is disposed on a bottom surface of the sliding groove, and the avoidance part is configured to avoid the second mounting part, so that the second mounting part can be mounted to the first mounting part. When the slider rotates, the second mounting part can be avoided by using the avoidance part, to prevent, during rotation of the swing arm, the second mounting part from being blocked by the groove wall of the sliding groove, so that the second mounting part can be mounted to a corresponding first mounting part.

In some embodiments of this application, the avoidance part includes an avoidance notch, the avoidance notch penetrates the bottom surface of the sliding groove, locations of the first mounting part and the avoidance notch are correspondingly disposed, and the second mounting part is located inside the avoidance notch. In this way, the second mounting part can rotate below the base by using the avoidance notch, and the second mounting part can be mounted to the corresponding first mounting part.

In some embodiments of this application, the base includes a first base body and a second base body, the second base body is disposed between the first base body and the shaft cover, the second base body is fixedly connected to the first base body, and the second base body is fixedly connected to the shaft cover; and a surface of the second base body facing towards the first base body has a second arc-shaped surface, a surface of the first base body facing towards the second base body has a first arc-shaped surface, the sliding groove is formed between the second arc-shaped surface and the first arc-shaped surface, and the avoidance part is disposed on the second base body. The second base body and the first base body are disposed on the base, the second arc-shaped surface is formed on the second base body, the first arc-shaped surface is formed on the first base body, and there is a specific distance between a corresponding second arc-shaped surface and the first arc-shaped surface. In this way, the sliding groove can be formed, which helps reduce a processing difficulty of parts, and also helps reduce an installation difficulty.

In some embodiments of this application, a surface of the slider facing towards the second base body is attached to the second arc-shaped surface, and a surface of the slider facing towards the first base body is attached to the first arc-shaped surface. That is, both the surface of the slider facing towards the second arc-shaped surface and the surface of the slider facing towards the first arc-shaped surface are disposed as corresponding arc-shaped surface structures, and are coaxially disposed with the first arc-shaped surface and the second arc-shaped surface, so that the slider can rotate around an axis between the first arc-shaped surface and the second arc-shaped surface.

In some embodiments of this application, a plurality of swing arms are disposed, and the plurality of swing arms are distributed along a length direction of the shaft cover; and the plurality of swing arms are disposed on two sides along the length direction of the shaft cover. By disposing the plurality of swing arms, connection points of the shaft cover in the length direction can be increased. When the swing arms are in the folded location, tensile force facing towards the base is applied to a plurality of locations of the shaft cover by the second mounting protrusion, thereby further improving connection strength of the shaft cover, and preventing the shaft cover from being subject to warpage and deformation in the direction away from the base.

According to a second aspect, this application provides a support apparatus, including a first middle frame, a second middle frame, and the hook mechanism according to any one of the foregoing solutions. The first middle frame is fixedly connected to the swing arm located on one side of the shaft cover, and the second middle frame is fixedly connected to the swing arm located on the other side of the shaft cover. Because the support apparatus provided in this embodiment of this application includes the hook mechanism according to any one of the foregoing solutions, a same technical problem can be resolved, and a same technical effect can be obtained.

According to a third aspect, this application provides an electronic device, including a foldable screen and the support apparatus according to the foregoing solutions, and the foldable screen is attached to the support apparatus. Because the electronic device provided in this embodiment of this application includes the support apparatus according to the foregoing solutions, a same technical problem can be resolved, and a same technical effect can be obtained.

Figure 1:
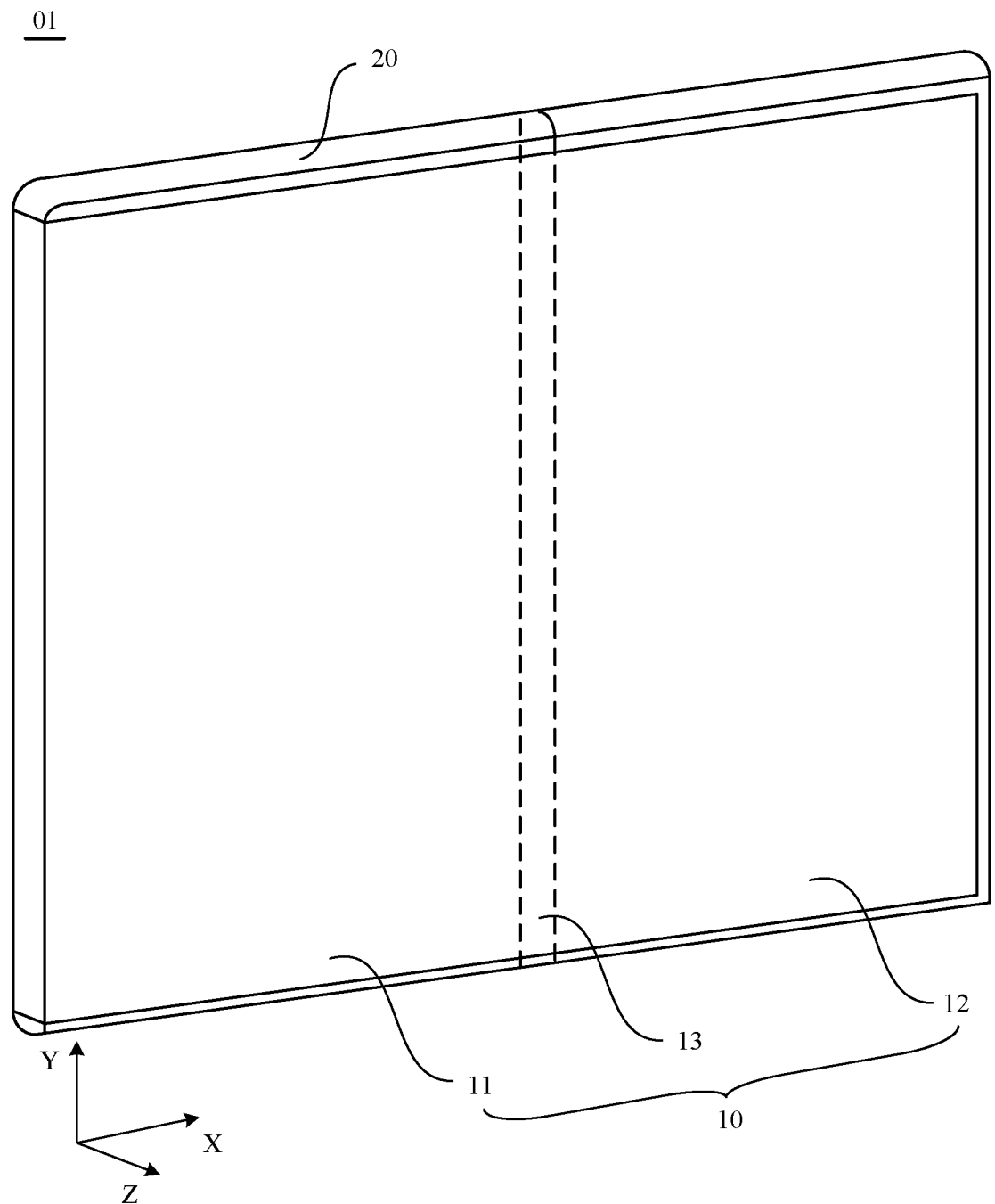
FIG. 1 is a diagram of a structure of an electronic device according to an embodiment of this application.

Reference numerals: 01—electronic device; 10—foldable screen; 11—first part; 12—second part; 13—third part; 20—support apparatus; 21—rotating shaft mechanism; 22—first middle frame; 23—second middle frame; 24—hook mechanism; 100—shaft cover; 110—first mounting part; 111—first mounting protrusion; 112—groove; 200—swing arm; 200a—first swing arm; 200b—second swing arm; 210—second mounting part; 211—second mounting protrusion; 220—swing arm body; 230—connecting arm; 240—slider; 241—arc-shaped surface; 300—base; 310—first base body; 311—first arc-shaped surface; 320—second base body; 321—second arc-shaped surface; 322—avoidance notch; 323—base lower subpart; 330—sliding groove; 340—first screw; 350 through hole; and 360—second screw.

DETAILED DESCRIPTION OF ILLUSTRATIVE EMBODIMENTS

The following describes technical solutions in embodiments of this application with reference to accompanying drawings in embodiments of this application. Apparently, the described embodiments are merely some rather than all embodiments of this application.

Terms such as "first" and "second" described below are used merely for description purposes, and are not understood to indicate or imply relative importance or implicitly indicate a quantity of indicated technical characteristics. Therefore, a characteristic defined with "first", "second", and the like may explicitly or implicitly include one or more characteristics.

In addition, in this application, azimuth terms such as "upper" and "lower" are defined relative to orientations in which components in the accompanying drawings are placed. It should be understood that these directional terms are relative concepts and are used for relative description and clarification, and may be correspondingly changed based on changes in the orientations in which the components in the accompanying drawings are placed.

In this application, unless otherwise specified and defined, a term "connection" should be understood in a broad sense. For example, a "connection" may be a fixed connection, may be a detachable connection, or may be integration, and may be a direct connection or an indirect connection implemented by using an intermediate medium.

This application provides an electronic device. The electronic device may be an electronic device having a foldable screen. In this embodiment, that an electronic device 01 shown in FIG. 1 is a mobile phone is used for description.

To facilitate description of the following embodiments, an XYZ coordinate system is established. A width direction of the electronic device 01 is defined as an X-axis direction, a length direction of the electronic device 01 is defined as a Y-axis direction, and a thickness direction of the electronic device 01 is defined as a Z-axis direction. It may be understood that the coordinate system of the electronic device 01 may be flexibly set according to an actual requirement. This application only provides an example, which cannot be considered as a special limitation to this application.

Specifically, refer to FIG. 1. FIG. 1 is a diagram of a structure of an electronic device 01 according to an embodiment of this application. The electronic device 01 includes a foldable screen 10 and a support apparatus 20. The foldable screen 10 is supported on the support apparatus 20, and the foldable screen 10 is configured to display an image, a video, and the like. The foldable screen 10 includes a first part 11, a second part 12, and a third part 13. The third part 13 is disposed between the first part 11 and the second part 12. When the foldable screen 10 is folded, the third part 13 is bent, and the first part 11 is disposed opposite to the second part 12. At least the third part 13 of the foldable screen 10 is made of a flexible material. The first part 11 and the second part 12 may be made of a flexible material or may be made of a rigid material, or one of the first part 11 and the second part 12 may be made of a flexible material and the other of the first part 11 and the second part 12 may be made of a rigid material. This is not specifically limit in this application.

The foldable screen 10 may be an organic light-emitting diode (organic light-emitting diode, OLED) screen, a micro organic light-emitting diode (micro organic light-emitting diode) screen, a quantum dot light emitting diode (quantum dot light emitting diodes, QLED), a liquid crystal display (liquid crystal display, LCD), or the like.

Figure 2:
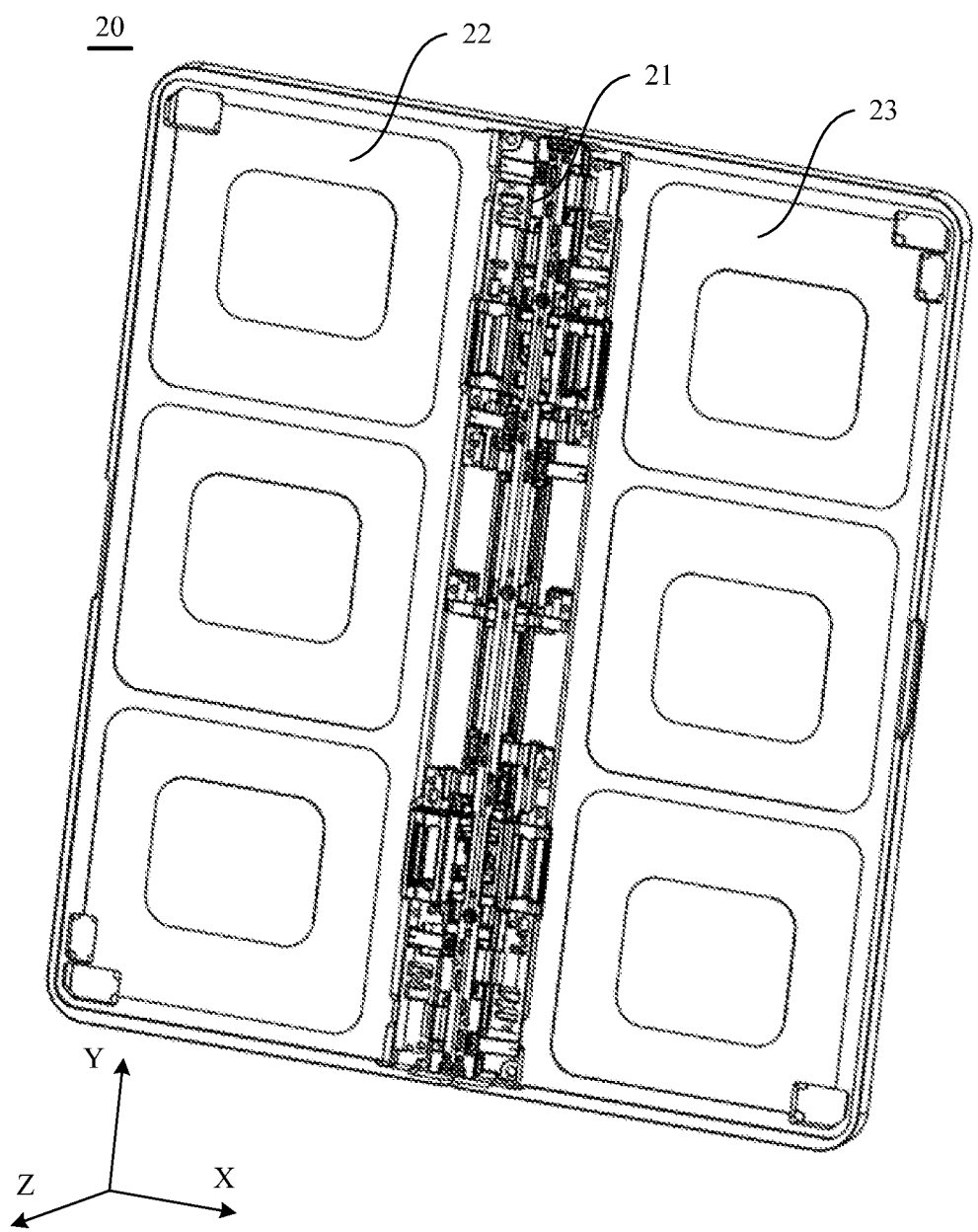
FIG. 2 is a diagram of a structure of a support apparatus according to an embodiment of this application.

FIG. 2 is a diagram of a structure of a support apparatus according to an embodiment of this application. The support apparatus 20 includes a first middle frame 22, a second middle frame 23, and a rotating shaft mechanism 21. The rotating shaft mechanism 21 is connected between the first middle frame 22 and the second middle frame 23.

Figure 3:
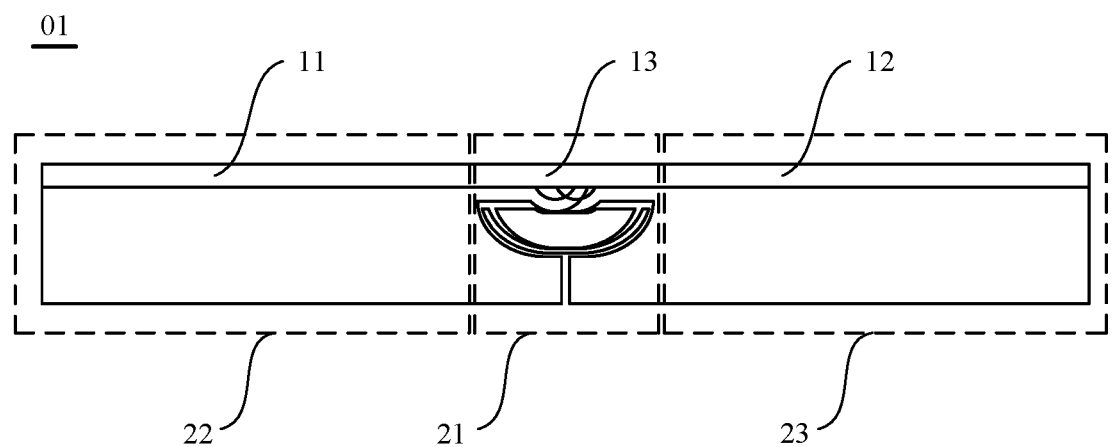
FIG. 3 is a diagram of a structure of an electronic device in an unfolded state according to an embodiment of this application.

FIG. 3 is a diagram of a structure of an electronic device 01 in an unfolded state according to an embodiment of this application. The first part 11 of the foldable screen 10 is attached and fixed to an attachment area (an area shown by a dashed-line box in the figure) corresponding to the first middle frame 22. The second part 12 of the foldable screen 10 is attached and fixed to an attachment area corresponding to the second middle frame 23. The third part 13 of the foldable screen 10 is attached and fixed to an attachment area corresponding to the rotating shaft mechanism 21. The first middle frame 22 and the second middle frame 23 may implement a rotatable connection by using the rotating shaft mechanism 21, so that the first middle frame 22 and the second middle frame 23 can rotate between a folded location and an unfolded location.

Still referring to FIG. 3, when the first middle frame 22 and the second middle frame 23 are in the unfolded location, the electronic device 01 is in the unfolded state. In this case, the foldable screen 10 is completely unfolded, and flatness of the foldable screen 10 can be ensured. In this state, large-screen display can be implemented, and better use experience can be brought to a user.

Figure 4:
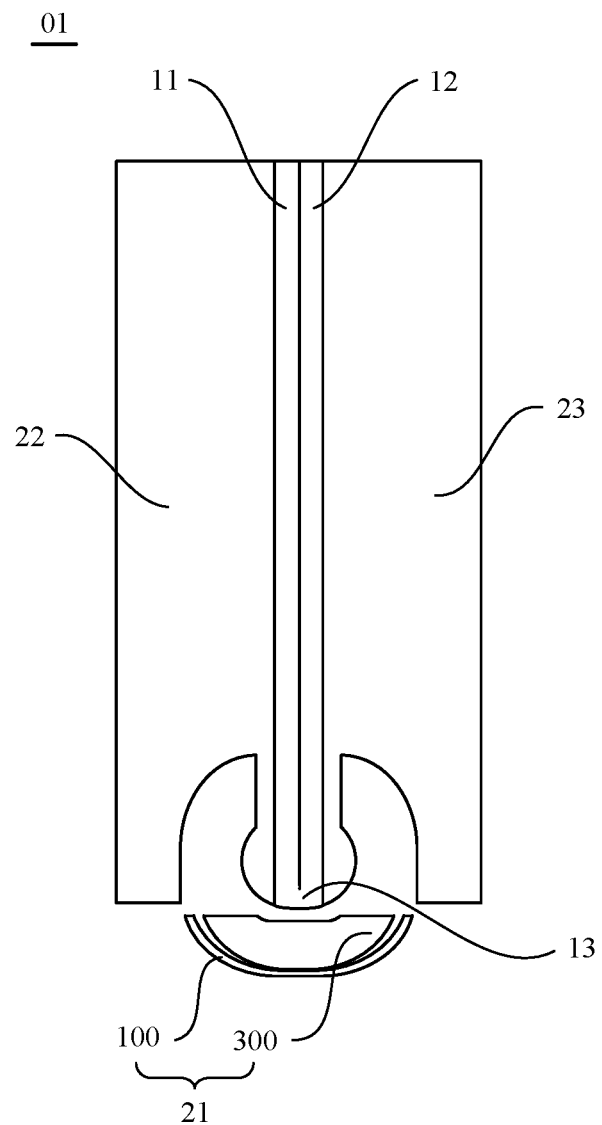
FIG. 4 is a diagram of a structure of an electronic device in a folded state according to an embodiment of this application.

FIG. 4 is a diagram of a structure of an electronic device 01 in a folded state according to an embodiment of this application. When the first middle frame 22 and the second middle frame 23 are in the folded location, the electronic device 01 is in the folded state. In this case, the first part 11 and the second part 12 of the foldable screen 10 are opposite to each other, and the third part 13 is in a bent state. The first middle frame 22 and the second middle frame 23 externally protect the foldable screen 10, and the foldable screen 10 is invisible to the user, to prevent the foldable screen 10 from being scratched or damaged, thereby effectively protecting the foldable screen 10.

In addition, still referring to FIG. 4, the rotating shaft mechanism 21 includes a shaft cover 100 and a base 300. The base 300 is disposed inside the shaft cover 100. When the first middle frame 22 and the second middle frame 23 are in the folded state, the shaft cover 100 is exposed to the outside. Therefore, appearance treatment needs to be performed on the shaft cover 100, to make an overall structure aesthetically pleasing.

Figure 5:
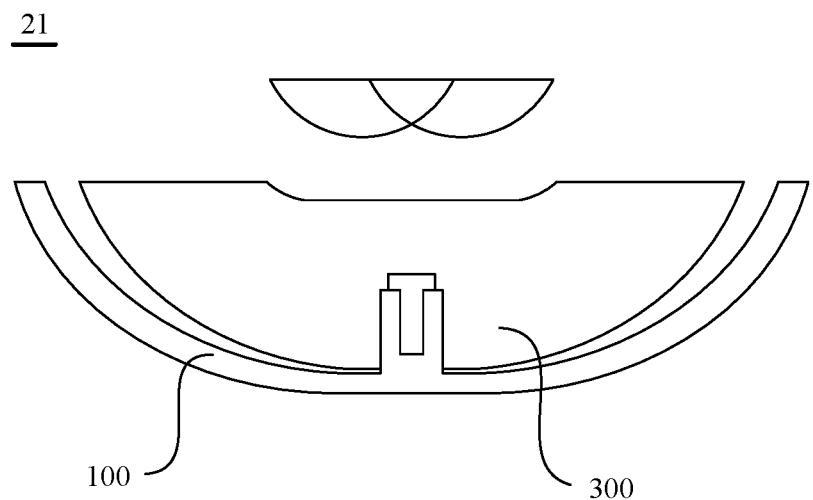
FIG. 5 is a diagram of a structure of a rotating shaft mechanism of an electronic device according to a related technology.
Figure 6:
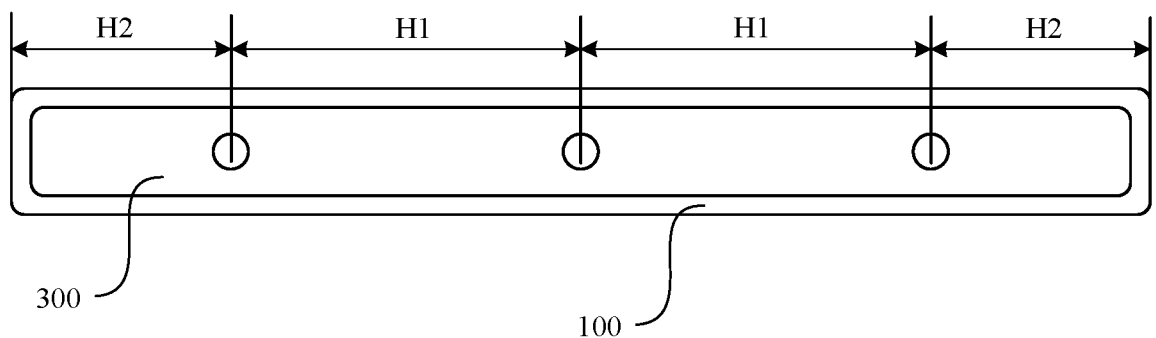
FIG. 6 is a schematic diagram of a connection structure between a shaft cover and a base according to a related technology.

FIG. 5 is a diagram of a structure of a rotating shaft mechanism 21 of an electronic device 01 according to a related technology. In the electronic device 01 provided in the related technology, the shaft cover 100 is fixedly connected to the base 300 by using a fixing member (for example, a screw, as shown in FIG. 5) or glue dispensing. FIG. 6 is a schematic diagram of a connection structure between a shaft cover 100 and a base 300 according to a related technology. A plurality of fixed points need to be disposed along a length direction of the shaft cover 100, to improve fixing strength between the shaft cover 100 and the base 300. However, on the shaft cover 100 and the base 300, due to reasons such as space and layout, a screw location or a glue dispensing location cannot be reserved at a location at which the shaft cover 100 and the base 300 need to be fixed. Consequently, there are relatively few fixed points between the shaft cover 100 and the base 300, or a distance H1 between two adjacent fixed points is excessively large, which causes a problem that fixing between the shaft cover 100 and the base 300 is not firm.

When the electronic device 01 is in the folded state, the shaft cover 100 is exposed to the outside. When the electronic device 01 is subject to external stress such as falling, the shaft cover 100 is warped, which affects overall appearance, and even causes serious problems such as falling off of the shaft cover 100. For example, still referring to FIG. 6, when a distance H2 between an end part of the shaft cover 100 and a fixed point between the shaft cover 100 and the base 300 is relatively large, the shaft cover 100 is exposed to the outside, and the end part of the shaft cover 100 is in a free state. Therefore, under an action of external force, warpage and deformation easily occur in a direction away from the base 300, which affects overall aesthetic appearance. In addition, when warpage and deformation are severe, rotation of the electronic device 01 from the folded state to the unfolded state is further affected, which affects user experience.

Figure 7:
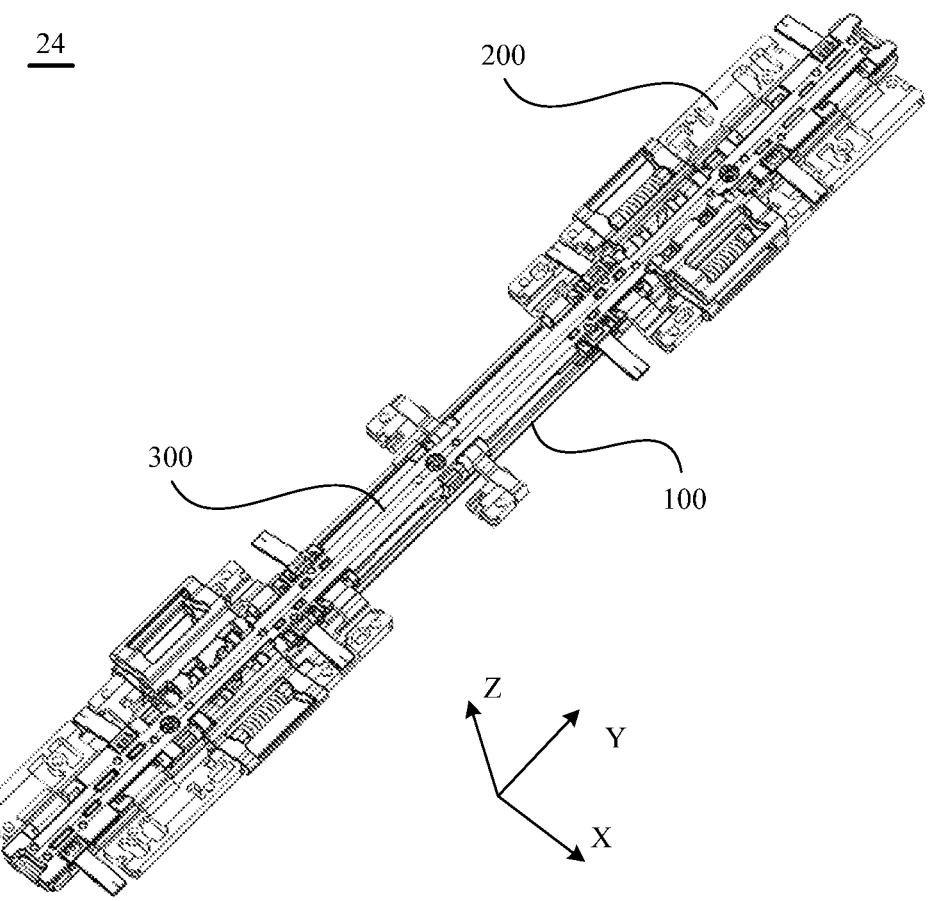
FIG. 7 is a diagram of a structure of a hook mechanism of an electronic device according to an embodiment of this application.
Figure 8:
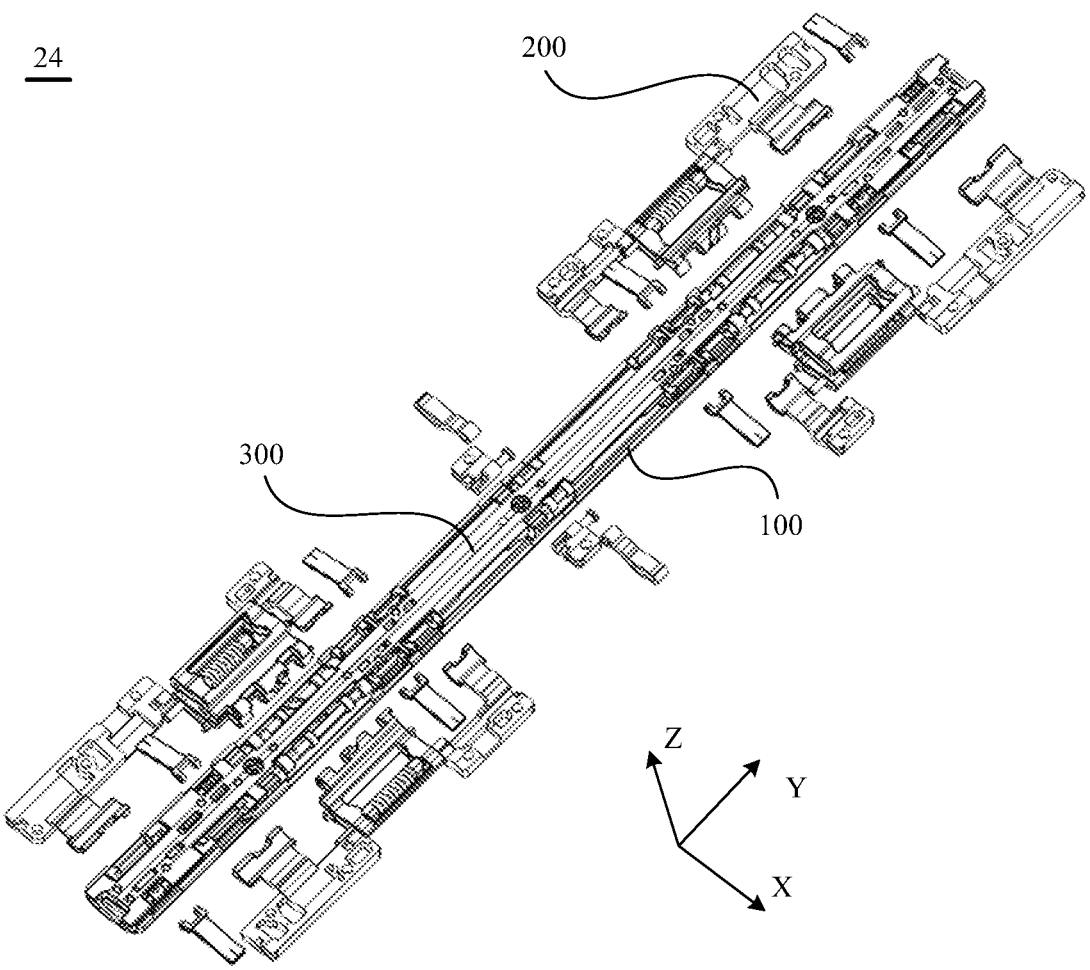
FIG. 8 is an exploded diagram of a hook mechanism provided in FIG. 7.

To resolve the foregoing problem, refer to FIG. 7 and FIG. 8. FIG. 7 is a diagram of a structure of a hook mechanism 24 of an electronic device 01 according to an embodiment of this application. FIG. 8 is an exploded diagram of a hook mechanism 24 provided in FIG. 7. The hook mechanism 24 includes the shaft cover 100, the base 300, and a plurality of swing arms 200. The base 300 is fixedly disposed inside the shaft cover 100, the plurality of swing arms 200 are rotatably connected to the base 300, and the swing arm 200 can rotate relative to the base 300 between the unfolded location and the folded location.

Figure 9:
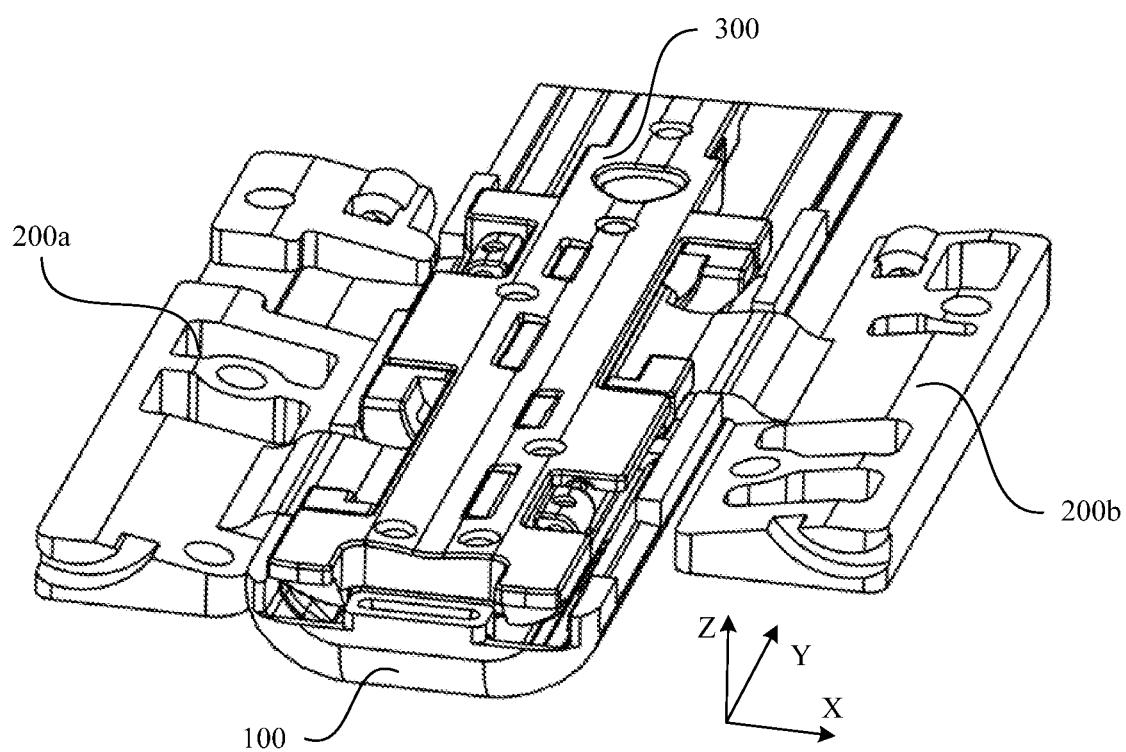
FIG. 9 is a diagram of a structure of a hook mechanism in an unfolded state according to this application.

FIG. 9 is a diagram of a structure of a hook mechanism 24 in an unfolded state according to this application. The shaft cover 100 has a first side (namely, a left side of the shaft cover 100 in FIG. 9) and a second side (namely, a right side of the shaft cover 100 in FIG. 9) along a Y direction (namely, a first direction). The swing arms 200 may include a first swing arm 200*a* and a second swing arm 200*b*. The first swing arm 200*a* is located on the first side of the shaft cover 100, the second swing arm 200*b* is located on the second side of the shaft cover 100, and two ends along the Y direction are provided with the first swing arm 200*a* and the second swing arm 200*b*. The first swing arm 200*a* and the second swing arm 200*b* can rotate relative to the base 300 between the unfolded location and the folded location.

Figure 10:
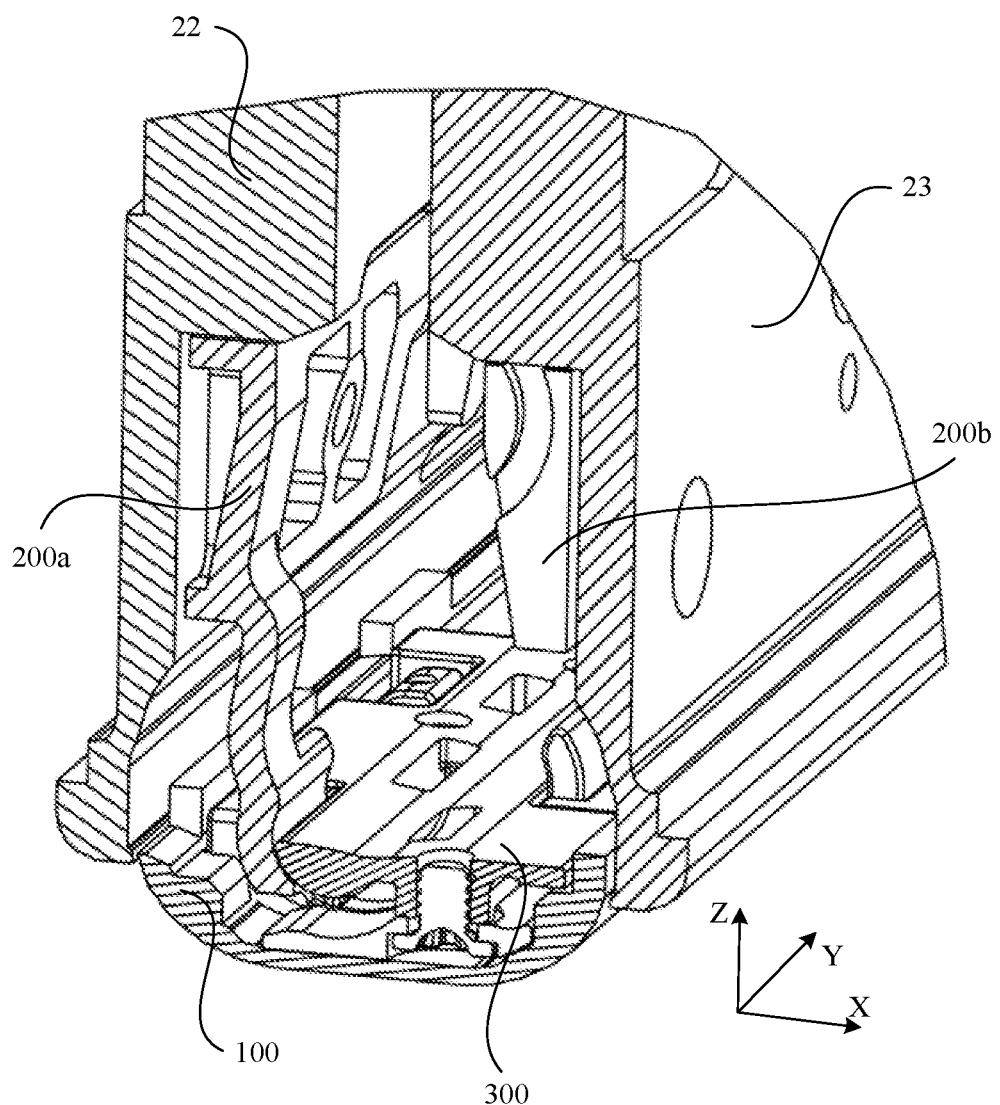
FIG. 10 is a diagram of a structure of a hook mechanism in a folded state according to this application.

Still referring to FIG. 9, when the first swing arm 200*a* and the second swing arm 200*b* are in the unfolded location, the first swing arm 200*a* and the second swing arm 200*b* are respectively located on the two sides of the shaft cover 100 along the Y direction (namely, the left side and the right side). FIG. 10 is a diagram of a structure of a hook mechanism 24 in a folded state according to this application. When the first swing arm 200*a* and the second swing arm 200*b* are in the folded location, both the first swing arm 200*a* and the second swing arm 200*b* are located on one side of the base 300 away from the shaft cover 100, and the first swing arm 200*a* and the second swing arm 200*b* are disposed opposite to each other.

It should be noted that the first swing arm 200*a* and the second swing arm 200*b* provided in this application have same structures, and are connected to the base 300 in same manners. A difference between the first swing arm 200*a* and the second swing arm 200*b* lies only in different mounting locations. The first swing arm 200*a* is disposed on the first side (namely, the left side in FIG. 9) of the shaft cover 100 along the Y direction, and the second swing arm 200*b* is disposed on the second side (namely, the right side in FIG. 9) of the shaft cover 100 along the Y direction. In this way, the first swing arm 200*a* may be fixedly connected to the first middle frame 22, and the second swing arm 200*b* may be fixedly connected to the second middle frame 23, so that the first middle frame 22 and the second middle frame 23 rotate between the unfolded location and the folded location.

Figure 11:
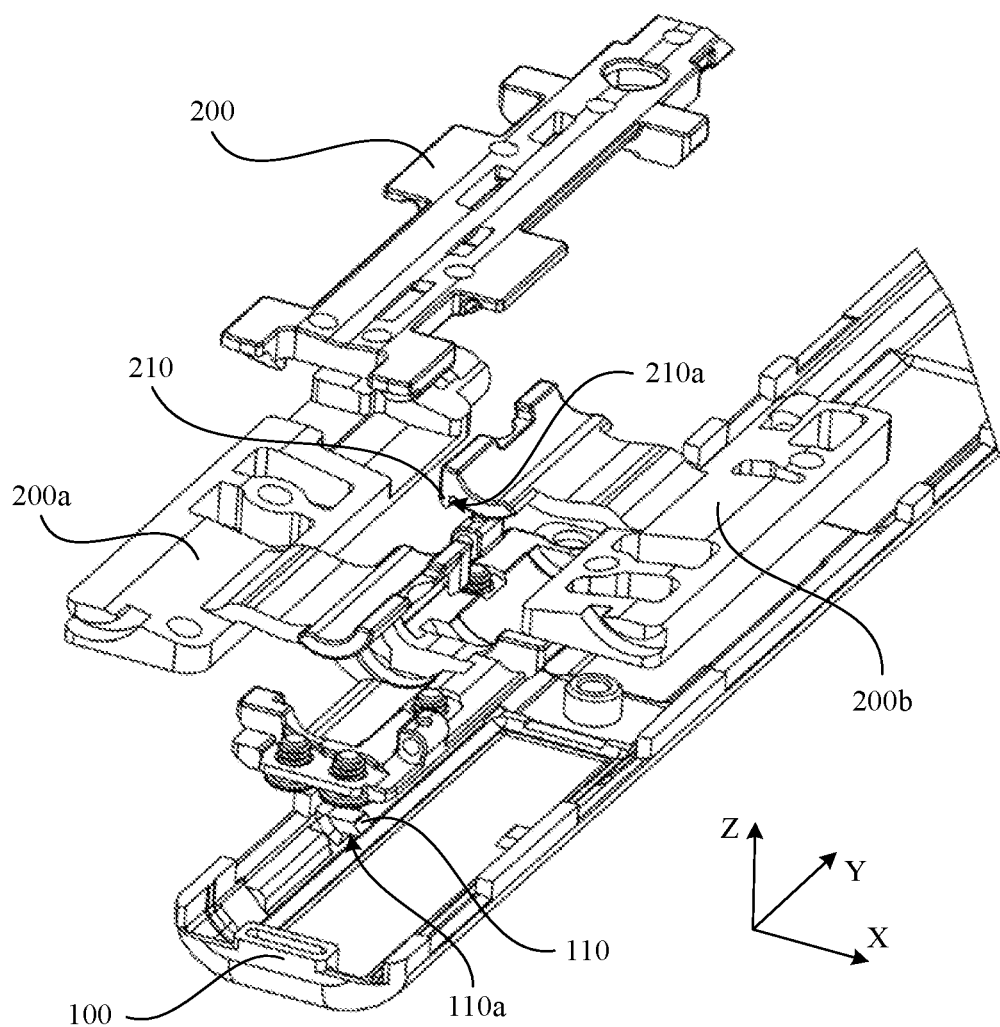
FIG. 11 is an exploded diagram of a partial structure of a hook structure provided in FIG. 7.

FIG. 11 is an exploded diagram of a partial structure of a hook structure 24 provided in FIG. 7. A plurality of first mounting parts 110 are disposed in the shaft cover 100, and a second mounting part 210 is disposed on both the first swing arm 200*a* and the second swing arm 200*b*. When the first swing arm 200*a* and the second swing arm 200*b* are in the unfolded state, the first mounting part 110 and the second mounting part 210 are separated from each other. When the first swing arm 200*a* and the second swing arm 200*b* are in the folded state, the first mounting part 110 is mounted to a corresponding second mounting part 210.

In some embodiments, still referring to FIG. 11, the first mounting part 110 includes a first fitting part 110*a*, and the second mounting part 210 includes a second fitting part 210*a*. When the first swing arm 200*a* and the second swing arm 200*b* are in the folded state, the first mounting part 110*a* and the second mounting part 210*a* cooperate with and abut against each other, so that the first mounting part 110 and the second mounting part 210 are mounted to each other.

Figure 12:
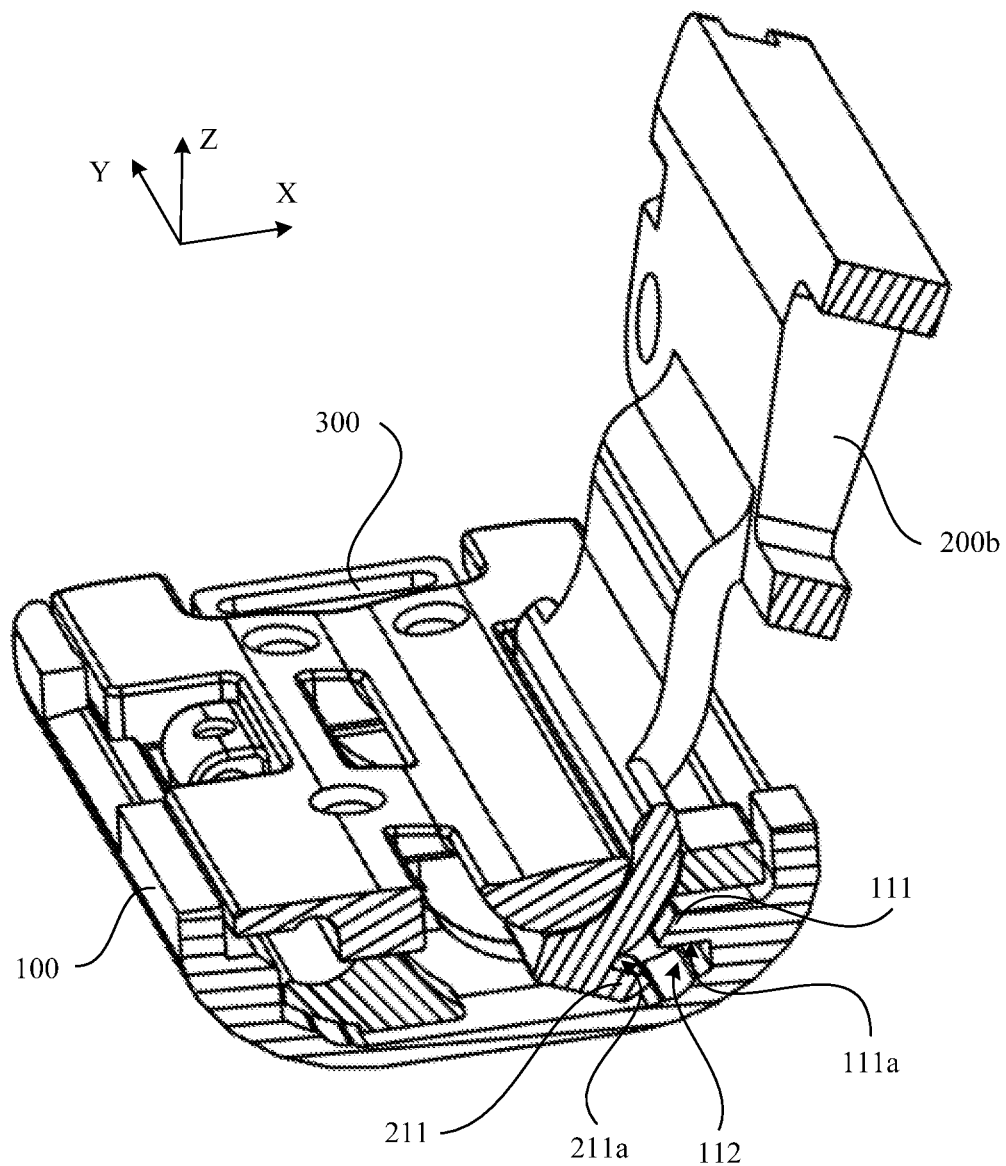
FIG. 12 is a cross-sectional view of a partial structure of a hook mechanism according to this application.

Specifically, refer to FIG. 12 with reference to FIG. 11. FIG. 12 is a cross-sectional view of a partial structure of a hook mechanism 24 according to this application. The first mounting part 110 includes a first mounting protrusion 111, the second mounting part 210 includes a second mounting protrusion 211, the first fitting part 110*a* includes a first surface 111*a*, the second fitting part 210*a* includes a second surface 211*a*, a surface of the first mounting protrusion 111 facing away from the base 300 is the first surface 111*a*, a surface of the second mounting protrusion 211 facing towards the base 300 is the second surface 211*a*, and a groove 112 is formed between the first surface 111*a* of the first mounting protrusion 111 and a bottom wall of the shaft cover 100.

Figure 13:
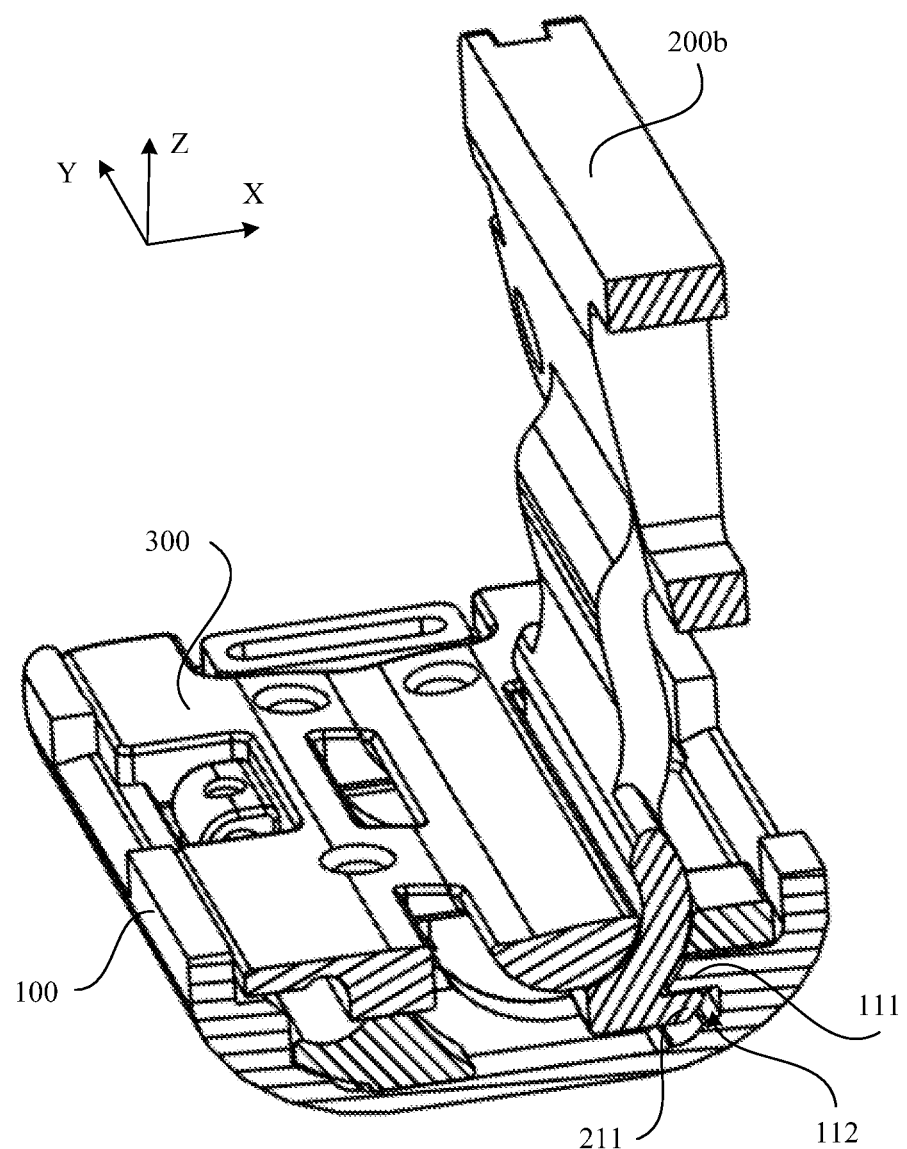
FIG. 13 is a diagram of a structure in which a first mounting protrusion and a second mounting protrusion are mounted to each other when a hook structure is in a folded state according to this application.

FIG. 13 is a diagram of a structure in which a first mounting protrusion 111 and a second mounting protrusion 211 are mounted to each other when a hook structure 24 is in a folded state according to this application. When the first swing arm 200*a* (not shown in the figure) and the second swing arm 200*b* are in the folded location, the second mounting protrusion 211 is inserted into the groove 112, and the first surface 111*a* and the second surface 211*a* shown in FIG. 12 abut against each other.

Figure 14:
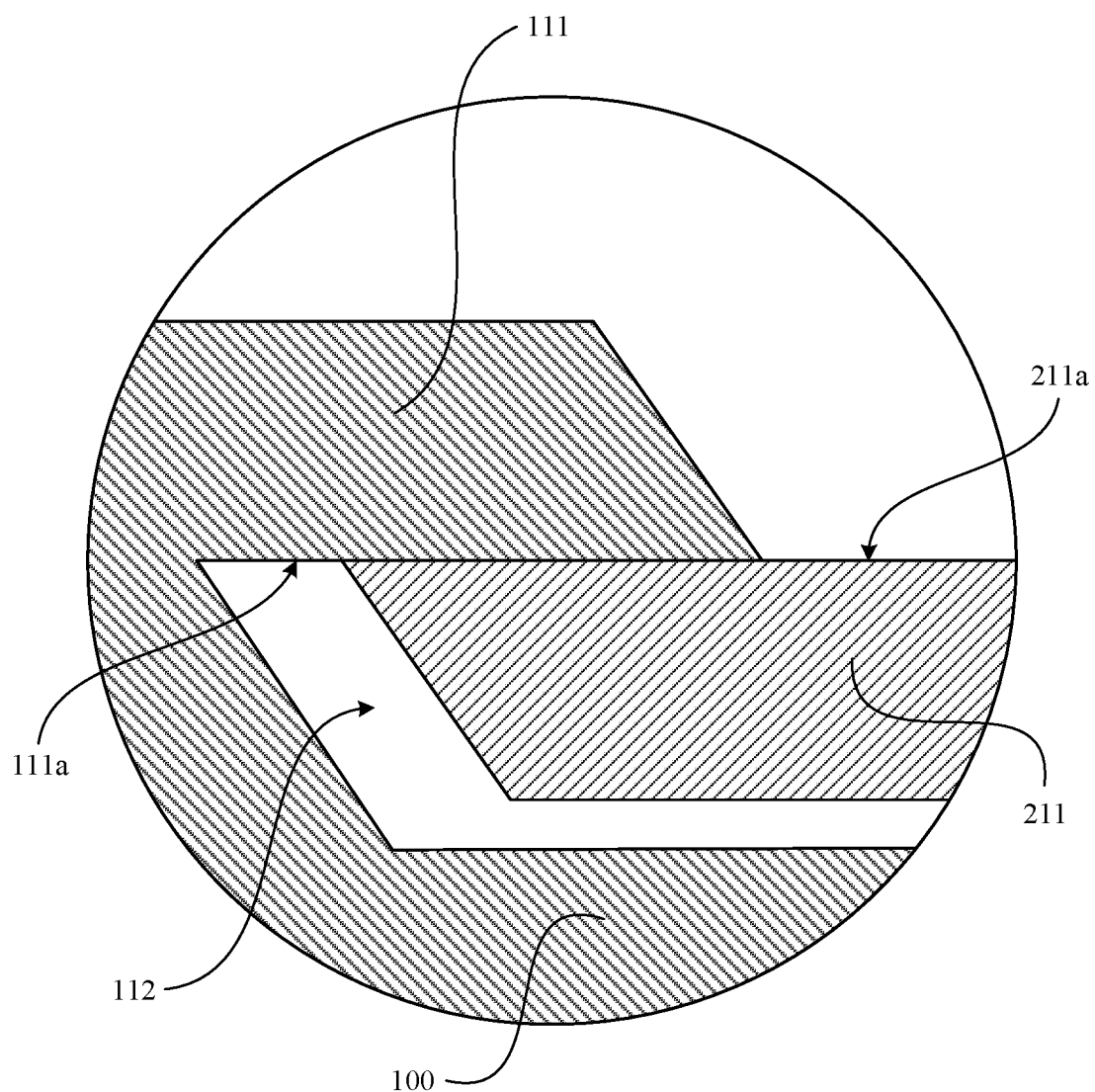
FIG. 14 is a diagram of a structure in which a first surface and a second surface abut against each other according to an embodiment of this application.

FIG. 14 is a diagram of a structure in which a first surface 111*a* and a second surface 211*a* abut against each other according to an embodiment of this application. When the first surface 111*a* and the second surface 211*a* abut against each other, at least parts of the first surface 111*a* is completely attached to and abuts against the second surface 211*a*. In this case, both the first surface 111*a* and the second surface 211*a* are planar surfaces. Therefore, after the second mounting protrusion 211 is inserted into the groove 112, the first surface 111*a* and the second surface 211*a* are attached to and abut against each other, so that the first mounting protrusion 111 and the second mounting protrusion 211 are mounted to each other.

Figure 15:
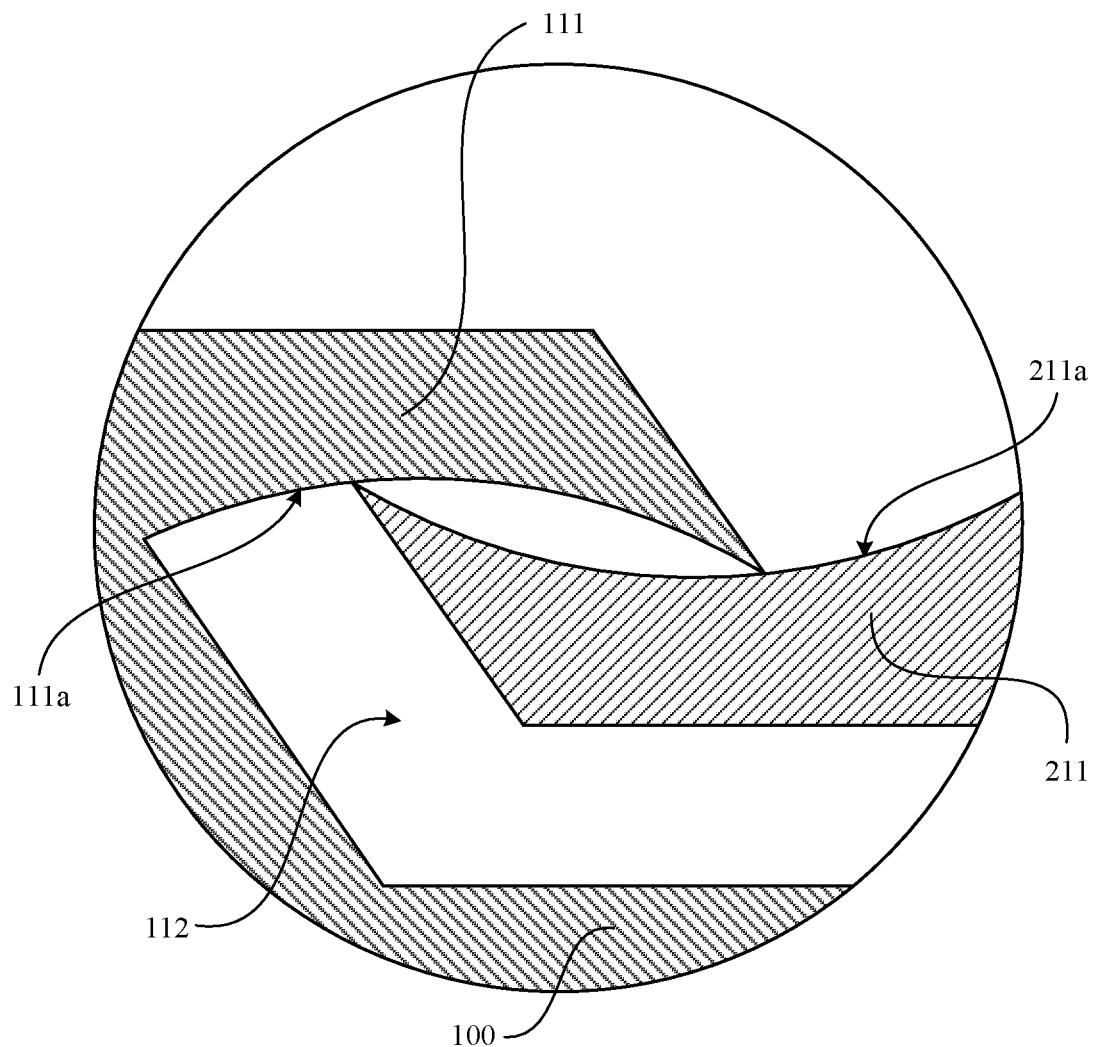
FIG. 15 is a diagram of another structure in which a first surface and a second surface abut against each other according to an embodiment of this application.

Alternatively, refer to FIG. 15. FIG. 15 is another diagram of a structure in which a first surface 111*a* and a second surface 211*a* abut against each other according to an embodiment of this application. Both the first surface 111*a* and the second surface 211*a* may alternatively be arc-shaped surfaces, and axes of the two arc-shaped surfaces are parallel to a rotation axis of the second mounting protrusion 211. When the second mounting protrusion 211 extends into the groove 112, an edge of the first surface 111*a* abuts against the second surface 211*a*, an edge of the second surface 211*a* abuts against the first surface 111*a*, and there is a gap between the two surfaces. In this case, both the first mounting protrusion 111 and the second mounting protrusion 211 form an arc-shaped structure approximate to that of a hook, so that the first mounting protrusion 111 and the second mounting protrusion 211 are mounted to each other.

Based on this, a movement process of the mounting structure 24 is described in detail by using an example of a connection structure between the second swing arm 200*b* and the shaft cover 100.

Figure 16:
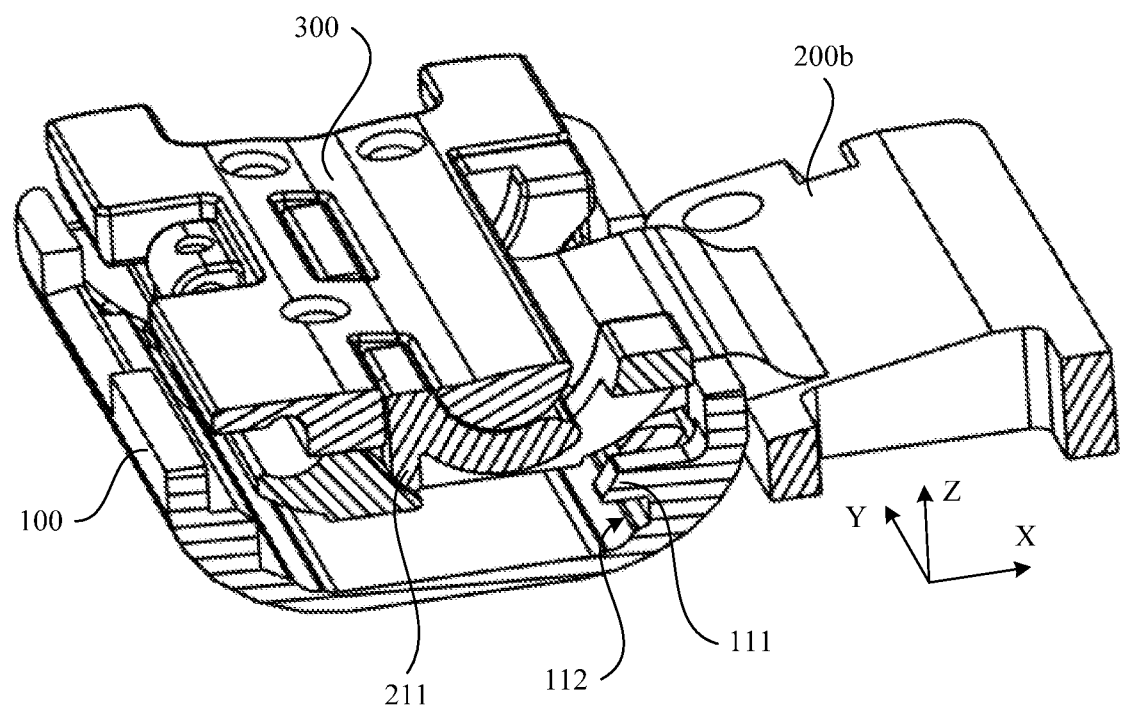
FIG. 16 is a diagram of a structure of a second swing arm and a shaft cover when a hook mechanism is in an unfolded state according to this application.

For example, refer to FIG. 16. FIG. 16 is a diagram of a structure of a second swing arm 200*b* and a shaft cover 100 when a hook mechanism is in an unfolded state according to this application. When the first swing arm (not shown in the figure) and the second swing arm 200*b* are in the unfolded location, the first swing arm is located on the first side (namely, a left side of the shaft cover 100 in FIG. 16) of the shaft cover 100 along the Y direction, and the second swing arm 200*b* is located on the second side (namely, a right side of the shaft cover 100 in FIG. 16) of the shaft cover 100 along the Y direction, to form support for the third part 13 of the foldable screen 10 shown in FIG. 1.

Figure 17:
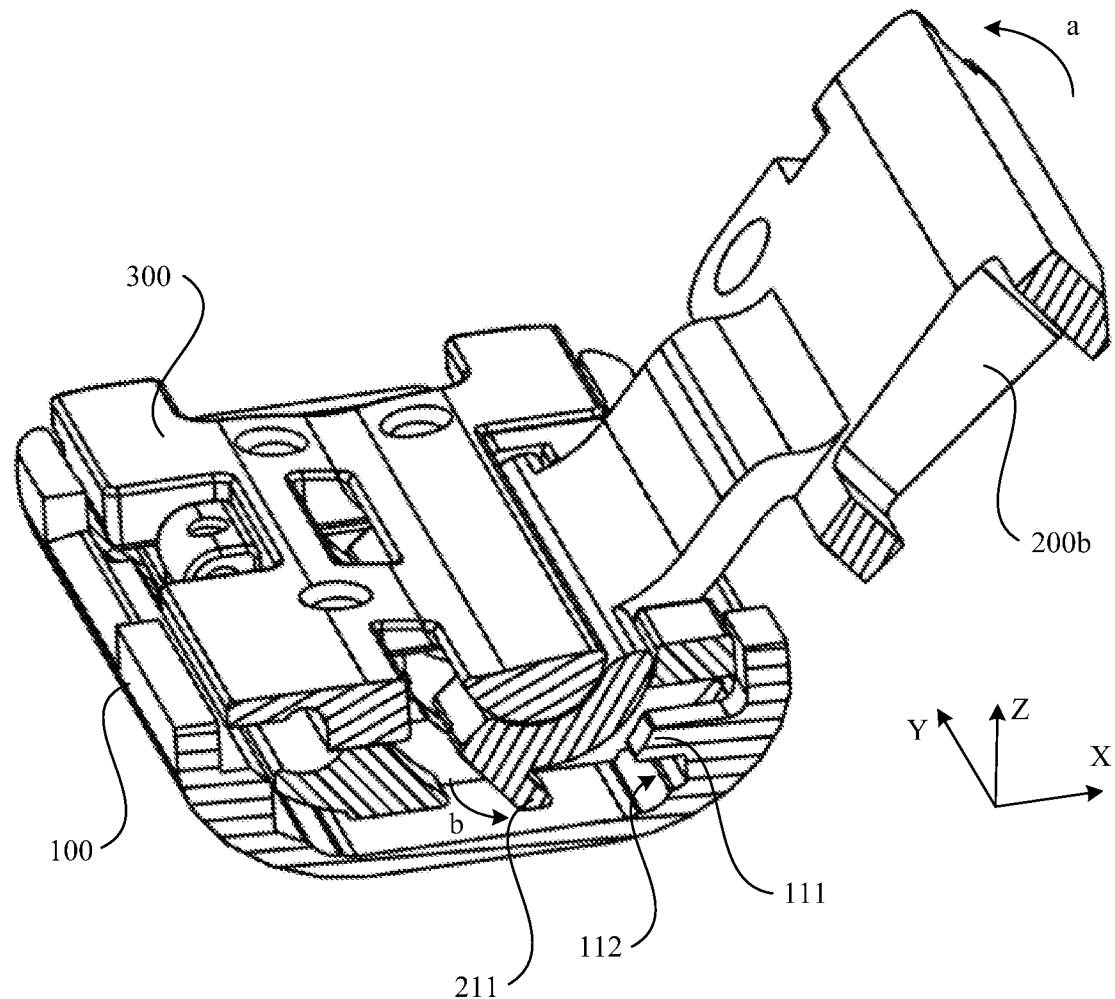
FIG. 17 is a diagram of a structure in which a second swing arm starts to rotate in a hook mechanism provided in FIG. 16.

Then, refer to FIG. 17. FIG. 17 is a diagram of a structure in which a second swing arm 200*b* is located between a folded state and an unfolded state in a hook mechanism 24 provided in FIG. 16. In a process in which the second swing arm 200*b* rotates from the unfolded location to the folded location, the second swing arm 200*b* rotates relative to the base 300 along an a direction, and simultaneously, the second mounting protrusion 211 on the second swing arm 200*b* rotates relative to the base 300 along a b direction. In this process, the second mounting protrusion 211 rotates in a direction of approaching the corresponding first mounting protrusion 111.

Finally, when the second swing arm 200b rotates to the folded location, the second swing arm 200b rotates to the location shown in FIG. 13, that is, the second swing arm 200b is located on the side of the base 300 away from the shaft cover 100. In addition, the second mounting protrusion 211 is inserted into the groove 112 formed between the corresponding first mounting protrusion 111 and the bottom wall of the shaft cover 100, and the first mounting protrusion 111 and the second mounting protrusion 211 abut against each other.

It should be noted that, in the foregoing movement process, rotation directions of the first swing arm 200a and the second swing arm 200b are opposite. Therefore, when the first swing arm 200a and the second swing arm 200b rotate to the folded location, the first swing arm 200a and the second swing arm 200b are opposite. In this location, the third part 13 of the foldable screen 10 shown in FIG. 1 is located between the first swing arm 200a and the second swing arm 200b.

In this way, when the first swing arm 200a and the second swing arm 200b are in the folded location, because the first mounting protrusion 111 and the second mounting protrusion 211 are mounted to each other, the swing arms 200 (including the first swing arm 200a and the second swing arm 200b) can apply tensile force to the shaft cover 100 towards the base 300, and even if the shaft cover 100 is exposed to the outside, it can be ensured that the shaft cover 100 cannot be subject to warpage and deformation in the direction away from the base 300. In addition, the first swing arm 200a and the second swing arm 200b are respectively disposed on the first side and the second side of the shaft cover 100, and both the first swing arm 200a and the second swing arm 200b are mounted with the second mounting protrusion 211 on the shaft cover 100 by using the first mounting protrusion 111, which helps balance force on the shaft cover 100. In addition, the first swing arm 200a and the second swing arm 200b are disposed at the two ends of the shaft cover 100 along the Y direction, to ensure that connection strength at the two ends of the shaft cover 100 is enhanced, thereby improving overall strength of the shaft cover 100. Compared with the conventional technology, according to the hook mechanism 24 provided in this embodiment of this application, on a basis that the shaft cover 100 is fixedly connected to the base 300 by using the screw or glue dispensing, the mounting structure including the first mounting protrusion 111 and the second mounting protrusion 211 is added, so that connection strength of the shaft cover 100 can be further improved. In addition, the mounting structure is disposed at the two ends of the shaft cover 100. When the electronic device 01 falls off, tensile force between the first mounting protrusion 111 and the second mounting protrusion 211 can prevent the end part of the shaft cover 100 from being subject to warpage and deformation in the direction away from the base 300, which can improve overall strength of the electronic device 01, is beneficial to overall aesthetic appearance, and improves user experience.

Figure 18:
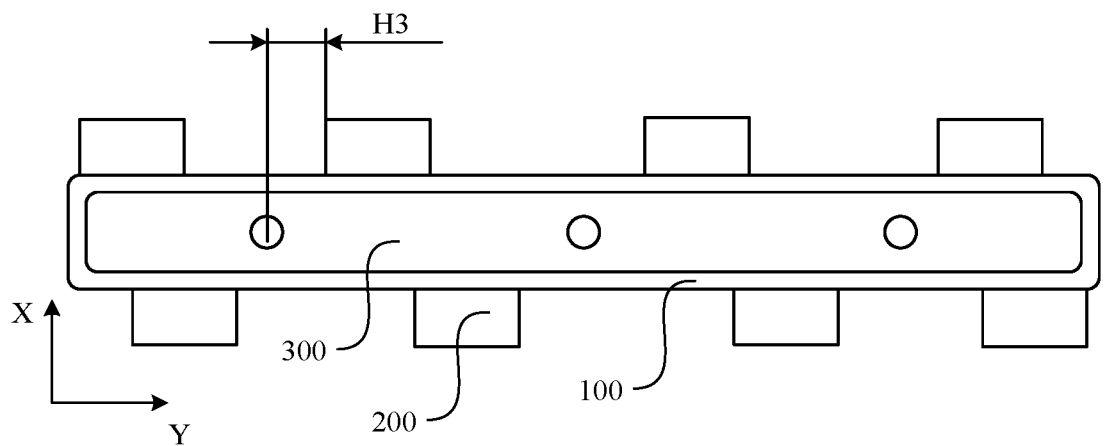
FIG. 18 is a schematic diagram of a distribution structure of fixed points between a shaft cover and a base and mounting points between the shaft cover and swing arms in a mounting structure according to this application.

In some embodiments, refer to FIG. 18. FIG. 18 is a schematic diagram of a distribution structure of connection points between a shaft cover 100 and a base 300 and mounting points between the shaft cover 100 and swing arms 200 in a mounting structure 24 according to this application. A plurality of swing arms 200 may be disposed (that is, a plurality of first swing arms 200a and a plurality of second swing arms 200b are disposed), and are sequentially distributed along the Y direction, that is, a plurality of mounting points formed by first mounting protrusions 111 and second mounting protrusions 211 are disposed along the Y direction. When the swing arm 200 is in the folded location, a middle area of the shaft cover 100 in the Y direction can also be subject to the tensile force towards the base 300. In this way, fixing strength of the shaft cover 100 can be further improved, and a probability that the shaft cover 100 is subject to warpage and deformation is greatly reduced.

The plurality of swing arms 200 (including the first swing arms 200a and the second swing arms 200b) may be evenly distributed along the Y direction, or a distribution manner may be determined based on actual space and a layout status. For example, still referring to FIG. 18, a plurality of fixed point locations (fixed by using screws or glue dispensing) between the shaft cover 100 and the base 300 may be successively distributed along the Y direction with the second mounting protrusions 211 on the plurality of swing arms 200, that is, the second mounting protrusion 211 and the fixed point location are prevented from being in a same straight line along an X direction. In this way, a distance H3 between fixed points of the shaft cover 100 (including the fixed point location between the shaft cover 100 and the base 300 and the mounting point between the first mounting protrusion 111 and the second mounting protrusion 211) can be reduced, so that it can be avoided that due to an excessively large distance between adjacent fixed points, fixing strength of the shaft cover 100 is reduced, and the shaft cover 100 is subject to warpage and deformation.

A structure of the first swing arm 200a is the same as that of the second swing arm 200b, and a connection structure between the first swing arm 200a and the base 300 is also the same as a connection structure between the second swing arm 200b and the base 300. Therefore, the following describes in detail a connection structure between the swing arm 200 and the base 300 by using the first swing arm 200a or the second swing arm 200b as an example.

Figure 19:
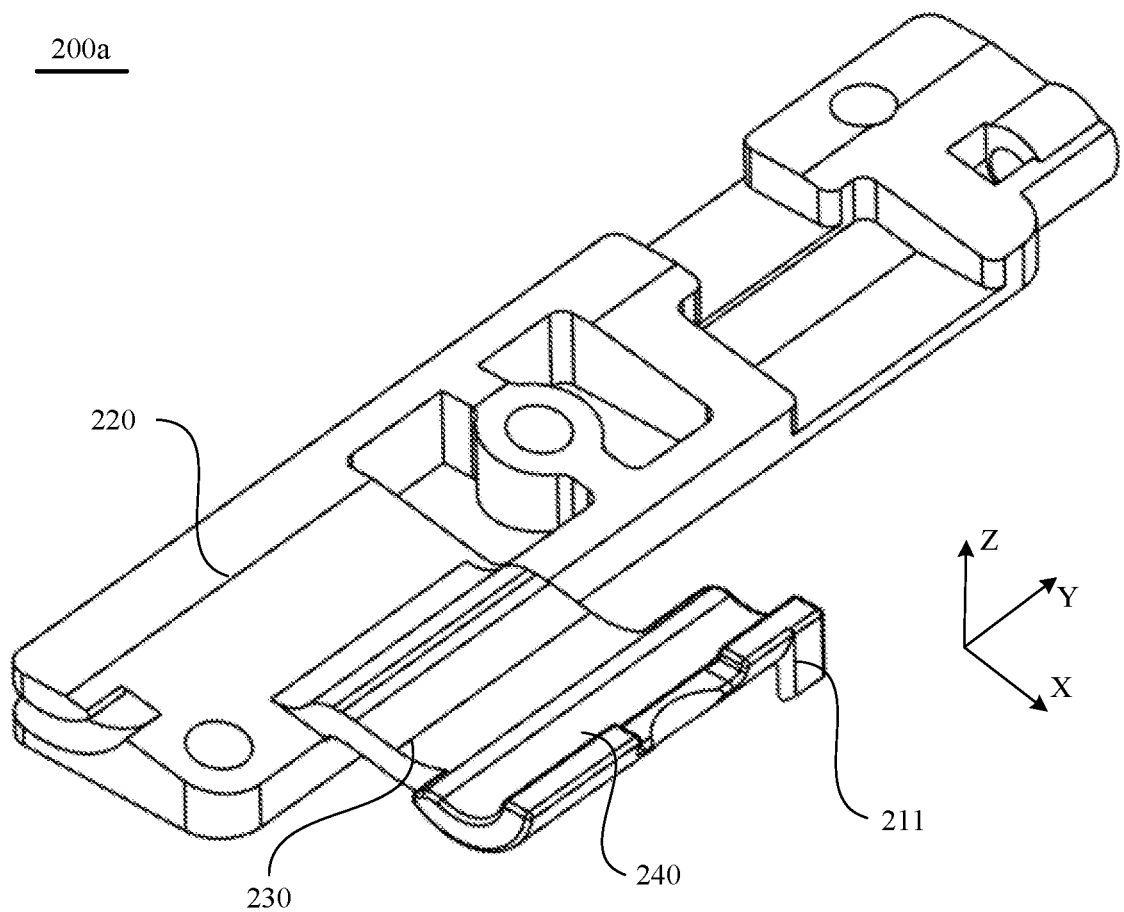
FIG. 19 is a diagram of a structure of a first swing arm according to this application.

FIG. 19 is a diagram of a structure of a first swing arm 200a according to this application. The first swing arm 200a provided in this embodiment of this application includes a swing arm body 220, a connecting arm 230, and a slider 240. A first end of the connecting arm 230 is fixedly connected to the swing arm body 220, and a second end of the connecting arm 230 is fixedly connected to the slider 240. The swing arm body 220, the connecting arm 230, and the slider 240 may be fixedly connected through bonding or by using another process, or may be an integrated structure formed by using a process such as injection molding. Therefore, this is not specifically limited in this application.

It should be noted that the swing arm body 220 refers to a component configured to be fixedly connected to the first middle frame 22 or the second middle frame 23, so that the first middle frame 22 and the second middle frame 23 can rotate relative to the base 300. The connecting arm 230 refers to a component configured to connect the slider 240 and the swing arm body 220, so that the swing arm body 220 can rotate relative to the base 300 together with the slider 240. The slider 240 refers to a component configured to rotatably connect to the base 300, so that an overall structure can rotate relative to the base 300.

In addition, the second mounting protrusion 211 is fixed to the slider 240, and only one or two or more second mounting protrusions 211 may be disposed. When only one second mounting protrusion 211 is disposed on the first swing arm 200a, the second mounting protrusion 211 may be disposed at any location of the slider 240 along the Y direction. For example, the second mounting protrusion is fixed to either of two side walls of the slider 240 along the Y direction. Alternatively, the second mounting protrusion 211 may be disposed on one side of the first swing arm 200a close to the end part of the shaft cover 100, that is, two second mounting protrusions 211 disposed on two first swing arms 200a are respectively disposed on two sides of the two first swing arms 200a along the Y direction. In this way, the second mounting protrusion 211 can be made closer to the end part of the shaft cover 100, thereby enhancing connection strength of the end part of the shaft cover 100, and avoiding warpage and deformation of the end part of the shaft cover 100.

When two second mounting protrusions 211 are disposed on the first swing arm 200a, the second mounting protrusions 211 may be disposed on two side walls of the slider 240 along the Y direction. When a plurality of second mounting protrusions 211 are disposed on the first swing arm 200a, the plurality of second mounting protrusions 211 are distributed on the slider 240 along the Y direction. In this way, the plurality of second mounting protrusions 211 can further improve connection strength of the shaft cover 100, and further reduce a probability that the end part of the shaft cover 100 is subject to warpage and deformation.

To implement a rotatable connection between the slider 240 and the base 300, the slider 240 may be hinged to the base 100 by using a rotating member (for example, a rotating shaft), to implement that the slider 240 (namely, the swing arm 200) rotates relative to the base 100, so that the swing arm 100 can rotate relative to the base 100 between the unfolded location and the folded location.

Figure 20:
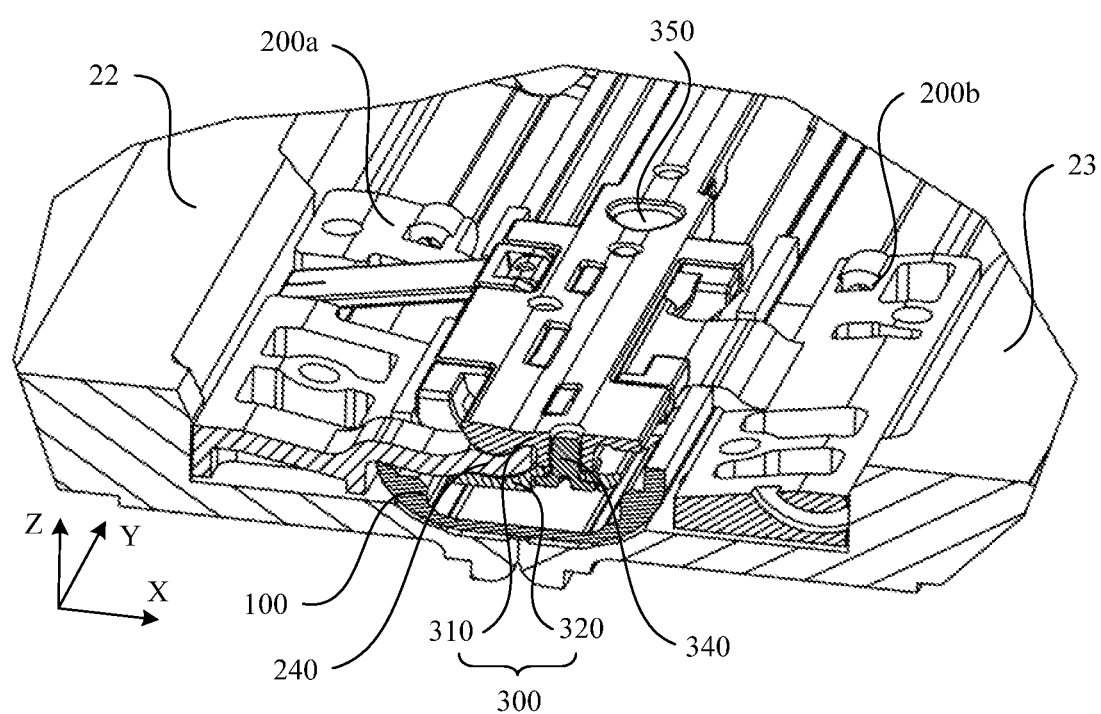
FIG. 20 is a cross-sectional view of a partial structure of a base of a hook mechanism according to this application.
Figure 21:
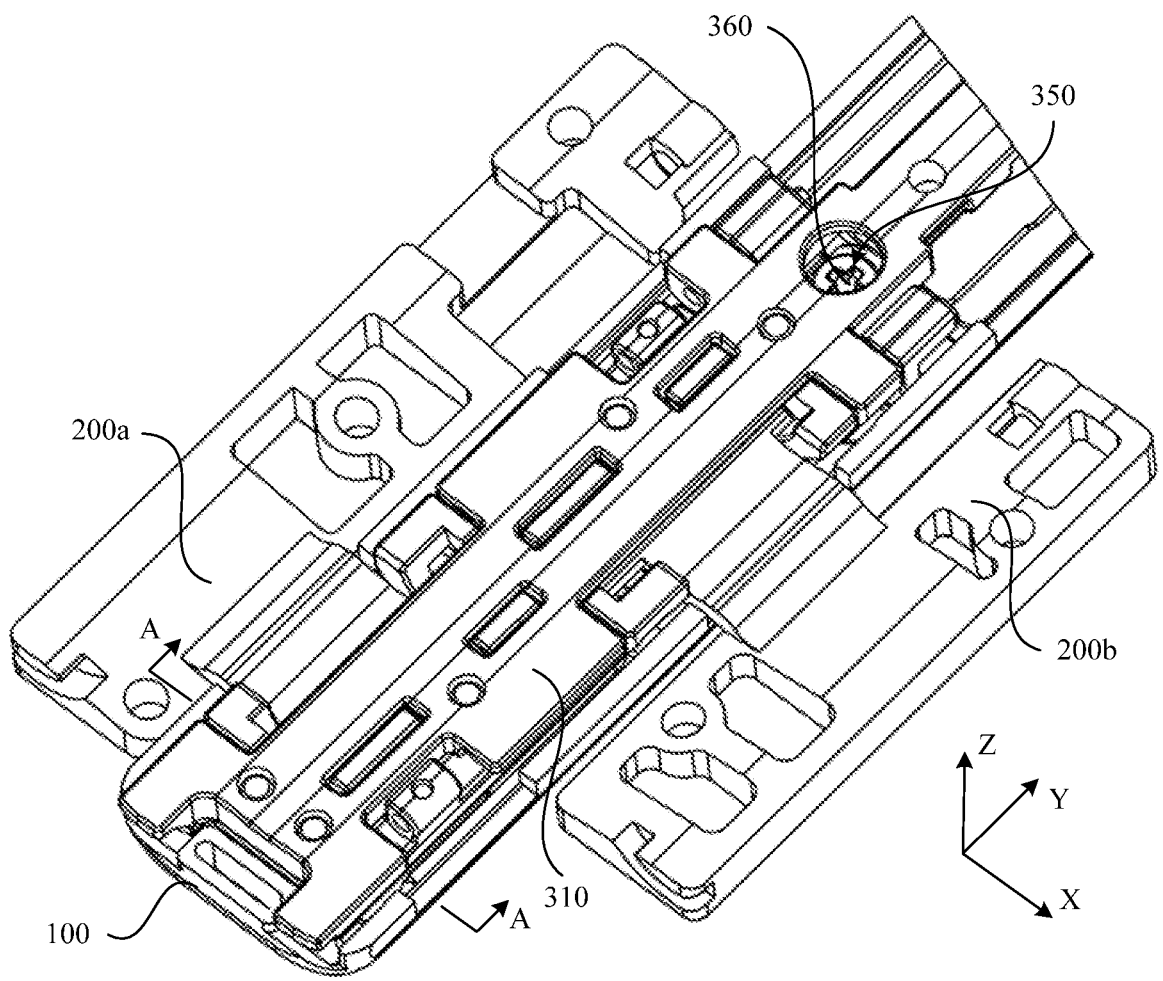
FIG. 21 is a diagram of a partial structure of a hook structure provided in FIG. 20.

Alternatively, refer to FIG. 20 and FIG. 21. FIG. 20 is a cross-sectional view of a partial structure of a base 300 of a hook mechanism 24 according to this application. FIG. 21 is a diagram of a partial structure of a hook structure 24 provided in FIG. 20. The base 300 provided in this embodiment of this application may include a first base body 310 and a second base body 320. The first base body 310 is fixedly connected to the second base body 320, and the second base body 320 is disposed between the first base body 310 and the shaft cover 100. For example, the first base body 310 may be fixedly connected to the second base body 320 by using a first screw 340. Then, a through hole 350 is provided on the first base body 310 and the second base body 320 along a Z direction. Then, a second screw 360 is used to pass through the through hole on the first base body 310 and the second base body 320. In addition, the second screw is configured to cooperate with a threaded hole on the shaft cover 100, to fixedly connect the first base body 310, the second base body 320, and the shaft cover 100.

In addition, the first base body 310 may be fixed to the second base body 320 through glue dispensing, and the second base body 320 may be fixed to the shaft cover 100 through glue dispensing. Therefore, this is not specifically limited in this application.

Figure 22:
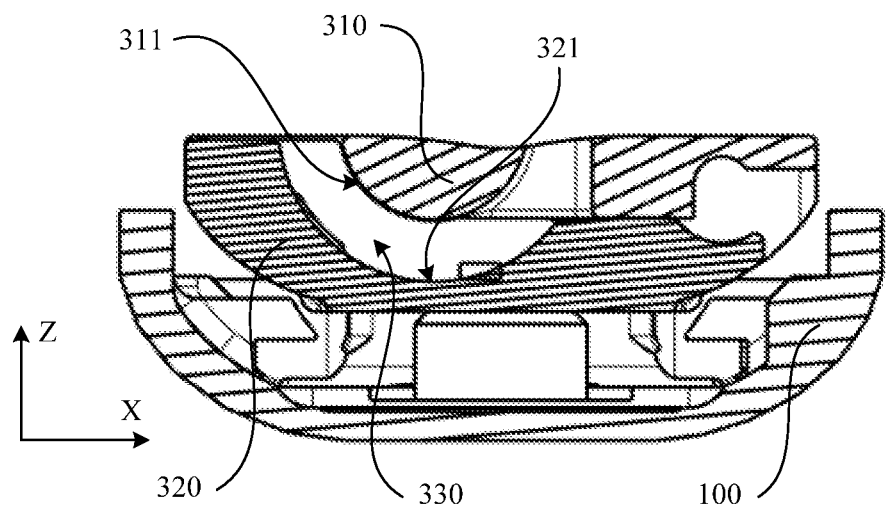
FIG. 22 is a diagram of a cross-section structure of a first base body, a second base body, and a shaft cover provided in FIG. 21.
Figure 23:
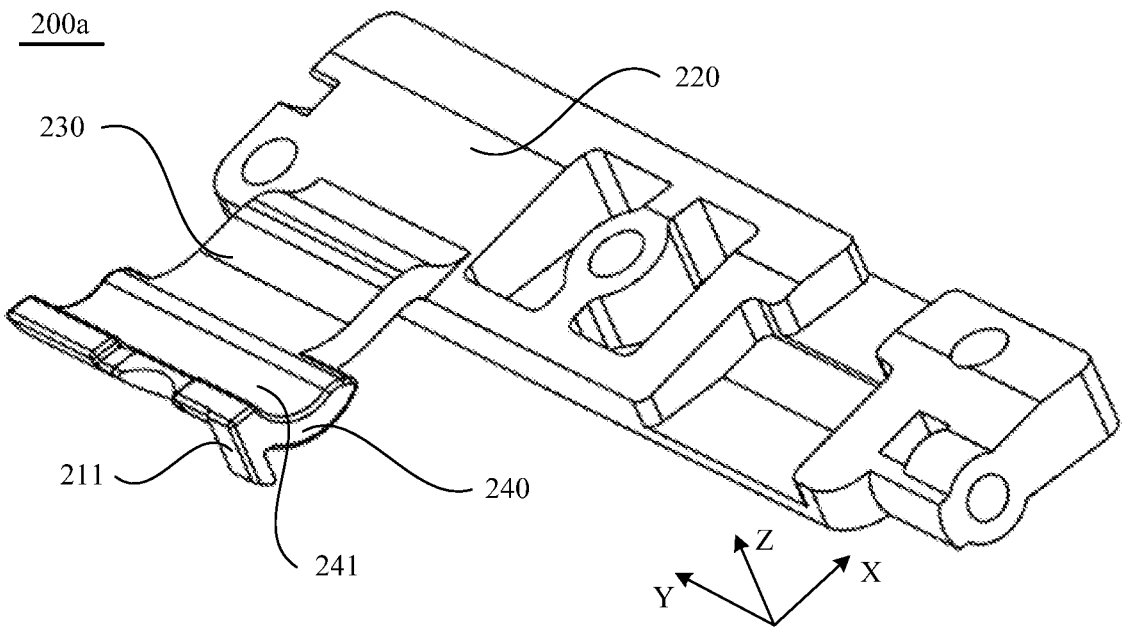
FIG. 23 is a diagram of a structure of a second swing arm according to this application.

Refer to FIG. 22 and FIG. 23. FIG. 22 shows an A-A cross-sectional view of a first base body 310, a second base body 320, and a shaft cover 100 provided in FIG. 21. FIG. 23 is a diagram of a structure of a second swing arm 200b according to this application. A plurality of first arc-shaped surfaces 311 are formed on a surface of the first base body 310 facing towards the second base body 320, a plurality of second arc-shaped surfaces 321 are formed on a surface of the second base body 320 facing towards the first base body 310, and the first arc-shaped surface 311 and a corresponding second arc-shaped surface 321 are coaxially disposed.

There is a specific distance between a corresponding first arc-shaped surface 311 and the corresponding second arc-shaped surface 321, to form a sliding groove 330. The slider 240 is disposed between the first arc-shaped surface 311 and the second arc-shaped surface 321 (as shown in FIG. 20), that is, the slider 240 is disposed in the sliding groove 330, so that the slider 240 can rotate around an axis of the first arc-shaped surface 311 and the second arc-shaped surface 321, that is, the first swing arm 200a can rotate around the axis of the first arc-shaped surface 311 and the second arc-shaped surface 321.

In addition, both a surface of the slider 240 facing towards the first arc-shaped surface 311 and a surface of the slider 240 facing towards the second arc-shaped surface 321 are arc-shaped surfaces 241, and the arc-shaped surface 241, the first arc-shaped surface 311, and the second arc-shaped surface 321 are coaxially disposed, so that the slider 240 can rotate around the axis between the first arc-shaped surface 311 and the second arc-shaped surface 321.

It should be noted that coaxial disposing of the first arc-shaped surface 311, the second arc-shaped surface 321, and the arc-shaped surface 241 of the slider 240 means that on a cross section perpendicular to the Y direction, the first arc-shaped surface 311, the second arc-shaped surface 321, and the arc-shaped surface 241 of the slider 240 are all an arc, and centers of these arcs coincide with each other. In addition, a motion track of the slider 240 rotates around a center of this circle.

In some embodiments, the base 300 may further use an integrated mechanism. To be specific, the sliding groove 330 is disposed on the base 300, a cross section of the sliding groove 330 perpendicular to the Y direction is an arc-shaped groove body structure, and then the slider 240 is disposed in the sliding groove 330, to implement a rotatable connection between the first swing arm 200a and the base 300.

Figure 24:
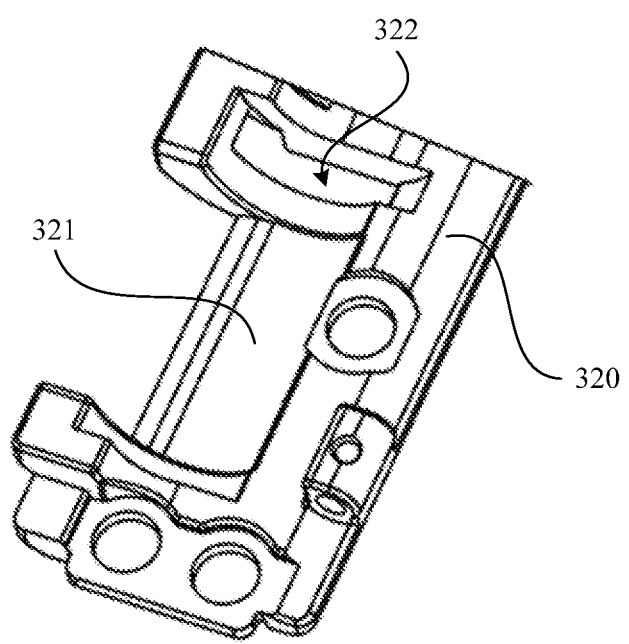
FIG. 24 is a diagram of a partial structure of a second base body according to this application.
Figure 25:
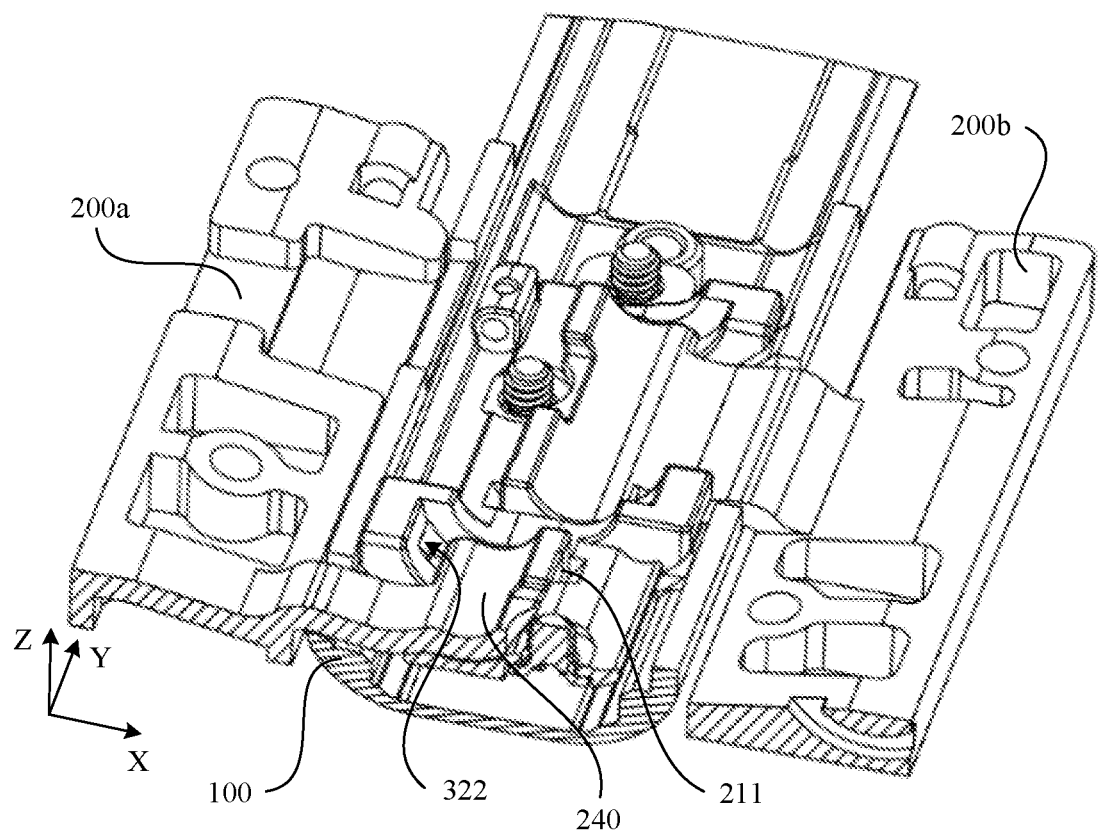
FIG. 25 is a diagram of a partial structure of a second base body, a first swing arm, and a second swing arm according to an embodiment of this application.
Figure 26:
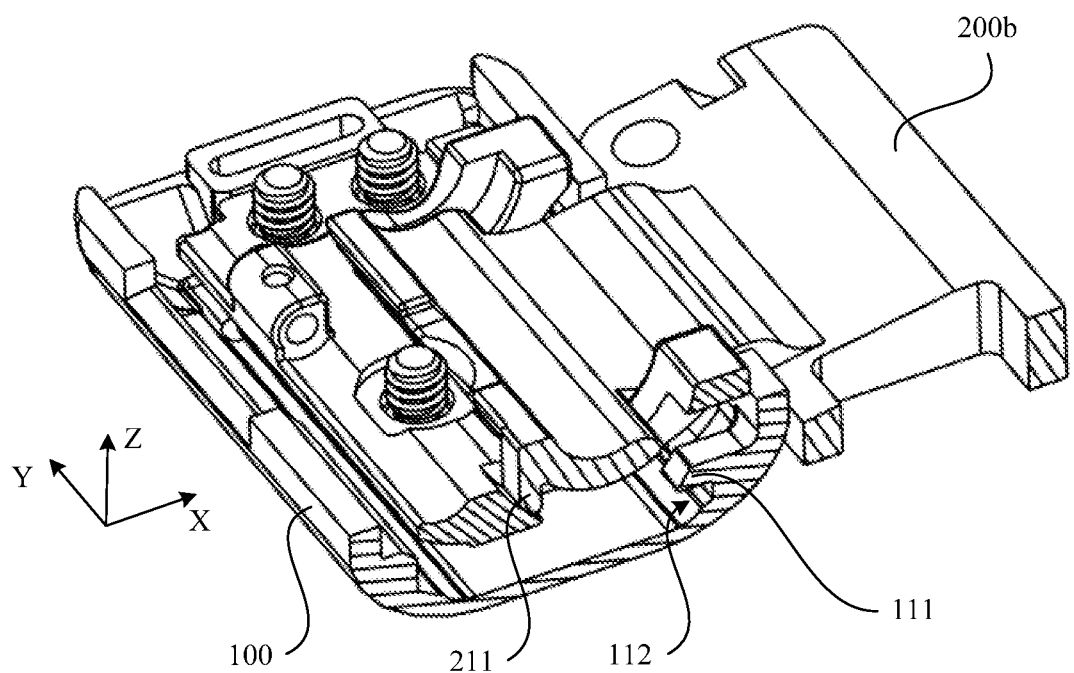
FIG. 26 is a diagram of a partial structure of a second base body and a second swing arm according to an embodiment of this application.

For ease of implementing mounting of the first mounting protrusion 111 and the corresponding second mounting protrusion 211, refer to FIG. 24, FIG. 25, and FIG. 26. FIG. 24 is a diagram of a partial structure of a second base body 320 according to this application. FIG. 25 is a diagram of a partial structure of a second base body 320, a first swing arm 200a, and a second swing arm 200b according to an embodiment of this application. FIG. 26 is a diagram of a partial structure of a second base body 320 and a second swing arm 200b according to an embodiment of this application.

An avoidance notch 322 is provided on the second base body 320, the avoidance notch 322 penetrates the second base body 320, the second mounting protrusion 211 is disposed at a corresponding avoidance notch 322, and locations of the first mounting protrusion 111, the corresponding second mounting protrusion 211, and the avoidance notch 322 are correspondingly disposed. In this way, in a rotation process of the first swing arm 200a, the second mounting protrusion 211 rotates, at the avoidance notch 322, around the axis of the second arc-shaped surface 321 and the first arc-shaped surface 311. When the first swing arm 200a rotates to the folded location, the second mounting protrusion 211 can be mounted to the corresponding first mounting protrusion 111 by using the avoidance notch 322.

The location of the avoidance notch 322 and the location of the second mounting protrusion 211 are correspondingly disposed, that is, the avoidance notch 322 is disposed on one side of the second arc-shaped surface 321 along the Y direction, or avoidance notches 322 are disposed on two sides, so that avoidance can be formed for the second mounting protrusion 211, and the first mounting protrusion 111 and the second mounting protrusion 211 are mounted to each other.

In some embodiments, both the second base body 320 and the first base body 310 may use an integrated structure, and are fixedly connected by using a screw, glue dispensing, or the like. Alternatively, the following split structure may be used.

Figure 27:
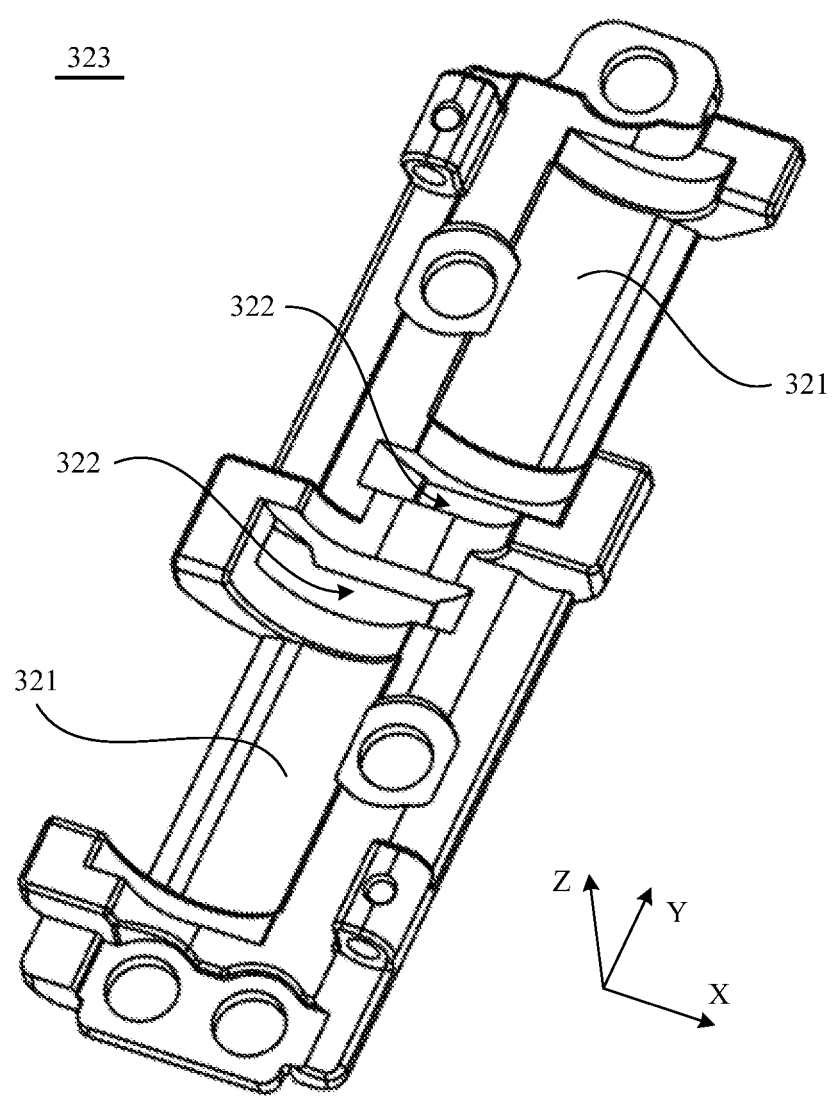
FIG. 27 is a diagram of a structure of a base lower subpart according to an embodiment of this application.
Figure 28:
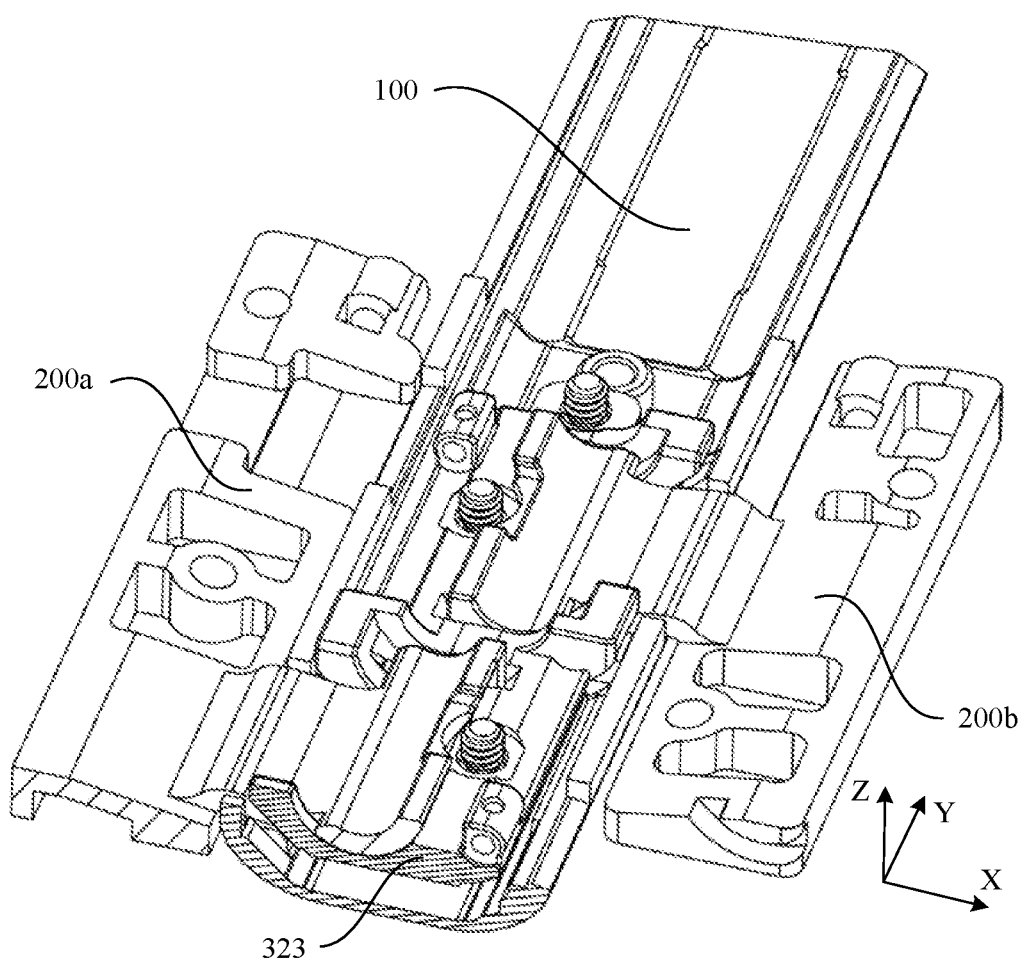
FIG. 28 is a diagram of an assembly structure of a base lower subpart, a first swing arm, and a second swing arm that are in an unfolded state according to an embodiment of this application.
Figure 29:
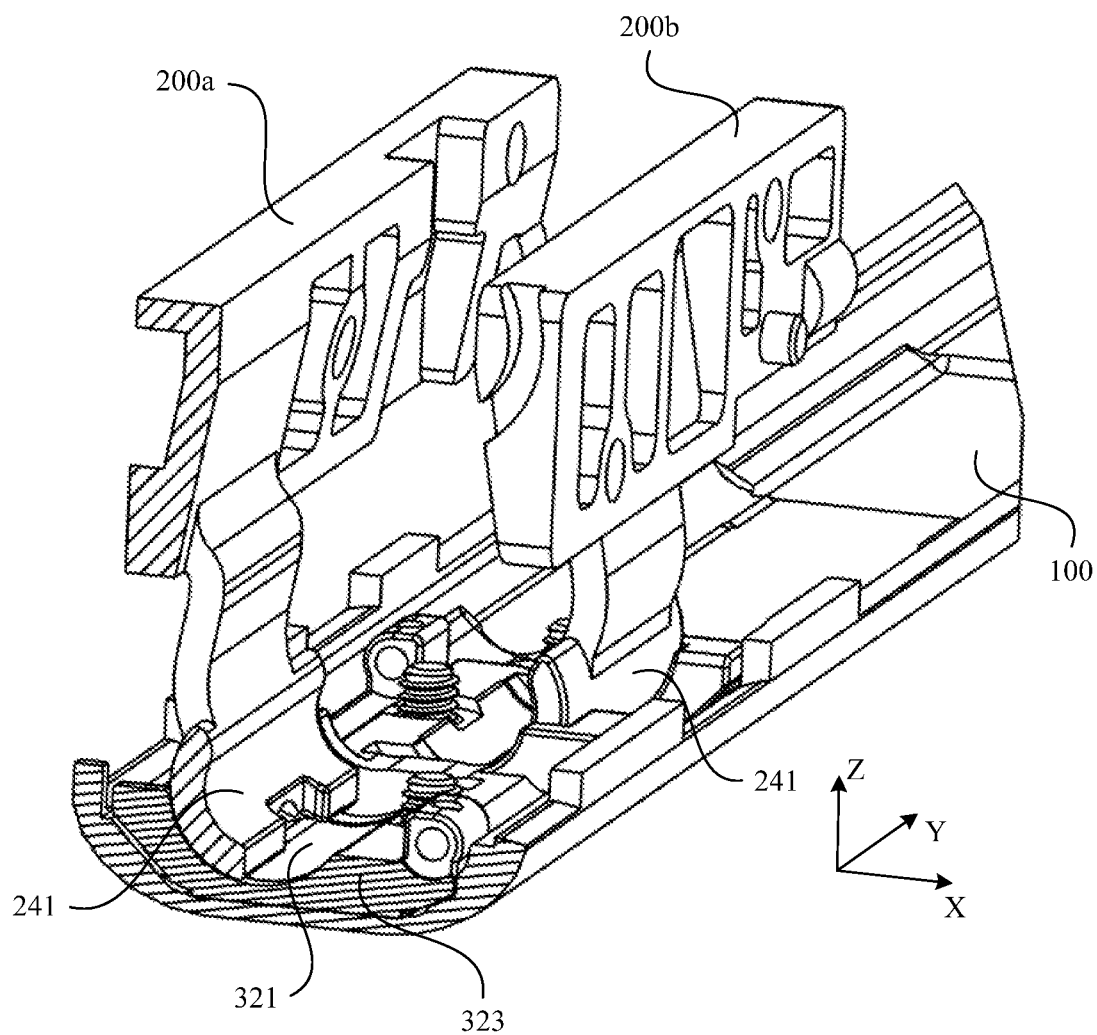
FIG. 29 is a diagram of an assembly structure of a base lower subpart, a first swing arm, and a second swing arm that are in a folded state according to an embodiment of this application.

For example, refer to FIG. 27, FIG. 28, and FIG. 29. FIG. 27 is a diagram of a structure of a base lower subpart 323 according to an embodiment of this application. FIG. 28 is a diagram of an assembly structure of a base lower subpart 323, a first swing arm 200a, and a second swing arm 200b that are in an unfolded state according to an embodiment of this application. FIG. 29 is a diagram of an assembly structure of a base lower subpart 323, a first swing arm 200a, and a second swing arm 200b that are in a folded state according to an embodiment of this application. The second base body 320 may include a plurality of base lower subparts 323, and the plurality of base lower subparts 323 are disposed in a one-to-one correspondence with the plurality of first swing arms 200a shown in FIG. 25. In this way, during production, the second base body 320 is divided into a plurality of sub-components for separate processing, helping reduce a processing difficulty.

In addition, two second arc-shaped surfaces 321 and two avoidance notches 322 are disposed on at least one base lower subpart 323, that is, one base lower subpart 323 corresponds to at least one first swing arm 200a and one second swing arm 200b, so that a rotatable connection can be implemented with the first swing arm 200a and the 1st second swing arm 200b. In addition, the base lower subpart 323 may not be disposed in an area in which the swing arm 200 is not disposed, thereby helping reduce production costs.

In the descriptions of this specification, specific features, structures, materials, or characteristics may be combined in any one or more embodiments or examples in a suitable manner.

The foregoing descriptions are merely specific implementations of this application, but are not intended to limit the protection scope of this application. Any change or replacement readily figured out by a person skilled in the art within the technical scope disclosed in this application shall fall within the protection scope of this application. Therefore, the protection scope of this application shall be subject to the protection scope of the claims.

What is claimed is:

1. A hook mechanism, comprising:
   a shaft cover, wherein a plurality of first mounting parts are disposed inside the shaft cover;
   a base, fixedly disposed in the shaft cover; and
   swing arms, wherein the swing arms are disposed at two ends of the shaft cover along a first direction, and a second mounting part is disposed on each of the swing arms;
   wherein each of the swing arms is rotatably connected to the base in a manner that the swing arms rotate between an unfolded location and a folded location, and wherein:
      when the swing arms are in the unfolded location, the swing arms are located on two sides of the shaft cover along the first direction, and each first mounting part is separated from a corresponding second mounting part; or
      when the swing arms are in the folded location, the swing arms located on the two sides of the shaft cover along the first direction rotate to one side of the base away from the shaft cover, the swing arms located on the two sides of the shaft cover along the first direction are disposed opposite to each other, and each first mounting part is mounted to the corresponding second mounting part.

2. The hook mechanism according to claim 1, wherein each first mounting part has a first fitting part, and each second mounting part has a second fitting part; and when the swing arms are in the folded location, each first fitting part cooperates with and abuts against the corresponding second fitting part.

3. The hook mechanism according to claim 2, wherein each first fitting part has a first surface, each first surface faces away from the base, each second fitting part has a second surface, and when the swing arms are in the folded location, each second surface faces towards the base, and each first surface abuts against the corresponding second surface.

4. The hook mechanism according to claim 3, wherein each first mounting part comprises a first mounting protrusion, each first mounting protrusion has the corresponding first surface, and a groove is formed between each first surface and a bottom wall of the shaft cover; each second mounting part comprises a second mounting protrusion, and each second mounting protrusion has the corresponding second surface; and
   when the swing arms are in the folded location, the second mounting protrusions are inserted into the grooves, and each second surface abuts against the corresponding first surface.

5. The hook mechanism according to claim 4, wherein each second mounting protrusion is disposed on a side of the corresponding swing arm that is closest to an end part of the shaft cover.

6. The hook mechanism according to claim 1, wherein each swing arm comprises:
   a swing arm body;
   a connecting arm, wherein a first end of the connecting arm is fixedly connected to the corresponding swing arm body; and
   a slider, fixedly connected to a second end of the corresponding connecting arm, wherein the slider is rotatably connected to the base, and a corresponding second mounting part is disposed on the slider.

7. The hook mechanism according to claim 6, wherein a sliding groove extends in the base, a groove wall of the sliding groove is an arc-shaped surface, an axis of the arc-shaped surface is parallel to a rotation axis of the swing arms, and each slider is disposed in the sliding groove.

8. The hook mechanism according to claim 7, wherein avoidance parts are disposed on a bottom surface of the sliding groove, and each avoidance part is configured to avoid the corresponding second mounting parts, so that each second mounting part is capable of being mounted to the corresponding first mounting part.

9. The hook mechanism according to claim 8, wherein the avoidance parts comprise avoidance notches, the avoidance notches penetrate the bottom surface of the sliding groove, locations of the first mounting parts and the avoidance notches are correspondingly disposed, and the corresponding second mounting parts are located inside the avoidance notch.

10. The hook mechanism according to claim 8, wherein the base comprises a first base body and a second base body, the second base body is disposed between the first base body and the shaft cover, the second base body is fixedly connected to the first base body, and the second base body is fixedly connected to the shaft cover; and a surface of the second base body facing towards the first base body has a second arc-shaped surface, a surface of the first base body facing towards the second base body has a first arc-shaped surface, the sliding groove is formed between the second arc-shaped surface and the first arc-shaped surface, and the avoidance parts are disposed on the second base body.

11. The hook mechanism according to claim 7, wherein a surface of each slider facing towards the second base body is attached to the second arc-shaped surface, and a surface of each slider facing towards the first base body is attached to the first arc-shaped surface.

12. The hook mechanism according to claim 1, wherein the swing arms are distributed along a length direction of the shaft cover; and the swing arms are disposed on two sides along the length direction of the shaft cover.

13. A support apparatus, comprising a first middle frame, a second middle frame, and a hook mechanism;
wherein the first middle frame is fixedly connected to a swing arm of the hook mechanism located on one side of the shaft cover, and the second middle frame is fixedly connected to a swing arm of the hook mechanism located on the other side of the shaft cover;
wherein:
the hook mechanism comprises a shaft cover, a base and the swing arms;
a plurality of first mounting parts are disposed inside the shaft cover;
the base is fixedly disposed in the shaft cover;
the swing arms are disposed at two ends of the shaft cover along a first direction, and a second mounting part is disposed on each of the swing arms;
the swing arms are rotatably connected to the base in a manner that the swing arms rotate between an unfolded location and a folded location; and
wherein:
when the swing arms are in the unfolded location, the swing arms are located on two sides of the shaft cover along the first direction, and each first mounting part is separated from a corresponding second mounting part; or
when the swing arms are in the folded location, the swing arms located on the two sides of the shaft cover along the first direction rotate to one side of the base away from the shaft cover, the swing arms located on the two sides of the shaft cover along the first direction are disposed opposite to each other, and each first mounting part is mounted to the corresponding second mounting part.

14. The support apparatus according to claim 13, wherein each first mounting part has a first fitting part, and each second mounting part has a second fitting part; and when the swing arms are in the folded location, each first fitting part cooperates with and abuts against the corresponding second fitting part.

15. The support apparatus according to claim 14, wherein each first fitting part has a first surface, each first surface faces away from the base, each second fitting part has a second surface, and when the swing arms are in the folded location, each second surface faces towards the base, and each first surface abuts against the second surface.

16. The support apparatus according to claim 15, wherein each first mounting part comprises a first mounting protrusion, each first mounting protrusion has the corresponding first surface, and a groove is formed between each first surface and a bottom wall of the shaft cover, each second mounting part comprises a second mounting protrusion, and each second mounting protrusion has the corresponding second surface; and when the swing arms are in the folded location, the second mounting protrusions are inserted into the groove, and each second surface abuts against the corresponding first surface.

17. The support apparatus according to claim 16, wherein each second mounting protrusion is disposed on a side of the corresponding swing arm that is closest to an end part of the shaft cover.

18. The support apparatus according to claim 13, wherein each swing arm comprises:
a swing arm body;
a connecting arm, wherein a first end of the connecting arm is fixedly connected to the corresponding swing arm body; and
a slider, fixedly connected to a second end of the corresponding connecting arm, wherein the slider is rotatably connected to the base, and the corresponding second mounting part is disposed on the slider.

19. The support apparatus according to claim 18, wherein a sliding groove extends in the base, a groove wall of the sliding groove is an arc-shaped surface, an axis of the arc-shaped surface is parallel to a rotation axis of the swing arm, and each slider is disposed in the sliding groove.

20. An electronic device, comprising:
a foldable screen and a support apparatus, wherein the foldable screen is attached to the support apparatus;
the support apparatus comprises a first middle frame, a second middle frame and a hook mechanism;
the first middle frame is fixedly connected to a swing arm of the hook mechanism located on one side of the shaft cover, and the second middle frame is fixedly connected to a swing arm of the hook mechanism located on the other side of the shaft cover;
the hook mechanism comprises a shaft cover, a base and the swing arms;
a plurality of first mounting parts are disposed inside the shaft cover;
the base is fixedly disposed in the shaft cover;
the swing arms are disposed at two ends of the shaft cover along a first direction, and a second mounting part is disposed on each of the swing arms;
the swing arms are rotatably connected to the base in a manner that the swing arms rotate between an unfolded location and a folded location; and
wherein:
when the swing arms are in the unfolded location, the swing arms are located on two sides of the shaft cover along the first direction, and each first mounting part is separated from a corresponding second mounting part; or
when the swing arms are in the folded location, the swing arms are located on the two sides of the shaft cover along the first direction rotate to one side of the base away from the shaft cover, the swing arms located on the two sides of the shaft cover along the first direction are disposed opposite to each other, and each first mounting part is mounted to the corresponding second mounting part.

* * * * *